(12) United States Patent
Garg et al.

(10) Patent No.: US 10,884,586 B2
(45) Date of Patent: Jan. 5, 2021

(54) METHOD AND SYSTEM FOR MANAGING AND DISPLAYING APPLICATION

(71) Applicant: Samsung Electronics Co., Ltd., Suwon-si (KR)

(72) Inventors: Jatin Garg, Noida (IN); Abhishek Verma, Noida (IN); Prabhat Kumar, Noida (IN); Pranav Jadav, Noida (IN); Shubham Jain, Noida (IN); Abhishek Gogia, Uttar Pradesh (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 15/974,193

(22) Filed: May 8, 2018

(65) Prior Publication Data
US 2018/0329590 A1    Nov. 15, 2018

(30) Foreign Application Priority Data

May 9, 2017    (IN)  .............................. 201741016339

(51) Int. Cl.
| | | |
|---|---|---|
| G06F 3/0483 | (2013.01) | |
| G06F 3/0484 | (2013.01) | |
| G06F 3/0485 | (2013.01) | |
| G06F 3/0482 | (2013.01) | |
| G06F 3/0481 | (2013.01) | |
| G06F 3/0488 | (2013.01) | |

(52) U.S. Cl.
CPC .......... *G06F 3/0483* (2013.01); *G06F 3/0481* (2013.01); *G06F 3/0482* (2013.01); *G06F 3/0485* (2013.01); *G06F 3/04842* (2013.01); *G06F 3/04845* (2013.01); *G06F 3/04883* (2013.01); *G06F 2203/04803* (2013.01); *G06F 2203/04806* (2013.01)

(58) Field of Classification Search
CPC .......................... G06F 3/0483; G06F 3/0481-2
See application file for complete search history.

(56) References Cited

U.S. PATENT DOCUMENTS

| | | | |
|---|---|---|---|
| 9,031,911 B2 | 5/2015 | Bachar et al. | |
| 2006/0230356 A1* | 10/2006 | Sauve ................... | G06F 3/0481 715/777 |
| 2009/0327947 A1* | 12/2009 | Schreiner .............. | G06F 3/0483 715/777 |
| 2010/0211872 A1 | 8/2010 | Rolston et al. | |
| 2011/0202877 A1 | 8/2011 | Lassonde et al. | |
| 2012/0159364 A1* | 6/2012 | Hyun .................... | G06F 3/0481 715/766 |
| 2013/0093687 A1 | 4/2013 | Papakipos et al. | |
| 2013/0198664 A1 | 8/2013 | Matas et al. | |

(Continued)

*Primary Examiner* — Roland J Casillas
(74) *Attorney, Agent, or Firm* — Jefferson IP Law, LLP

(57) ABSTRACT

A method of traversing across multiple user interface layers in a hierarchy of an application by an electronic device is provided. The method includes displaying a first user interface layer of the application on a screen of an electronic device. Further, the method includes detecting an input on a first graphical element displayed within the first user interface layer, and displaying, on the screen, the first user interface layer, a second user interface layer of the application, and at least one first indicia indicating a relation between the first user interface layer and the second user interface layer based on the input to traverse to the second user interface layer.

15 Claims, 30 Drawing Sheets

(56) References Cited

U.S. PATENT DOCUMENTS

| | | |
|---|---|---|
| 2014/0215408 A1 | 7/2014 | Park-Ekecs et al. |
| 2015/0095854 A1 | 4/2015 | Olenick et al. |
| 2015/0227283 A1 | 8/2015 | Luna et al. |
| 2015/0242106 A1 | 8/2015 | Penha et al. |
| 2016/0103793 A1* | 4/2016 | Fang .................... G06F 16/986 715/234 |
| 2016/0274766 A1 | 9/2016 | Song |

* cited by examiner

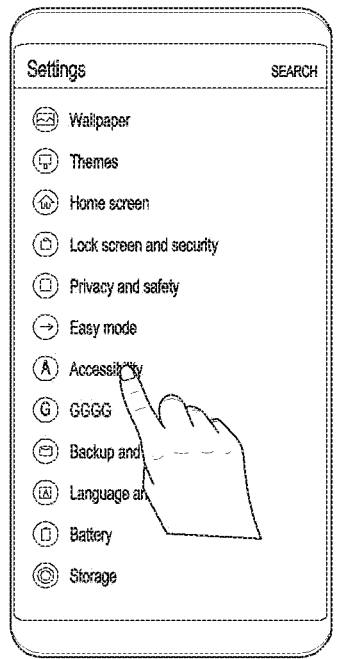
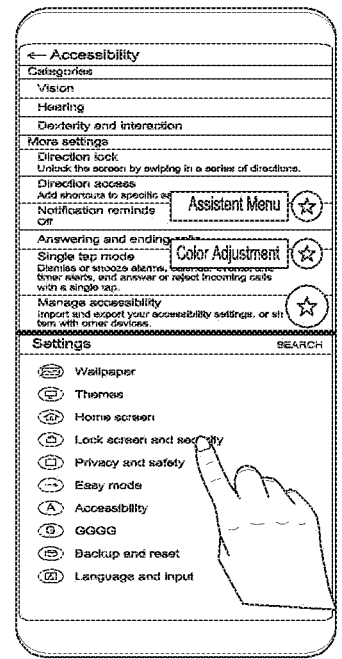
FIG.12A                FIG.12B
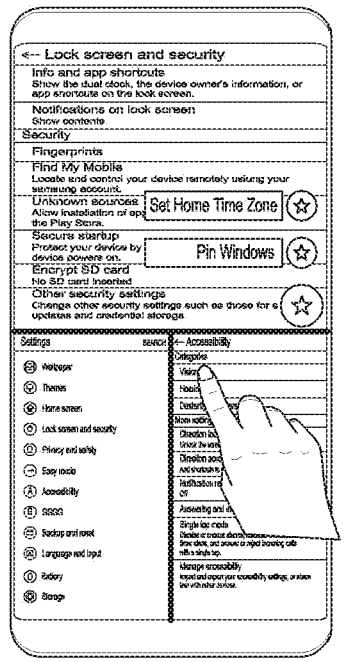
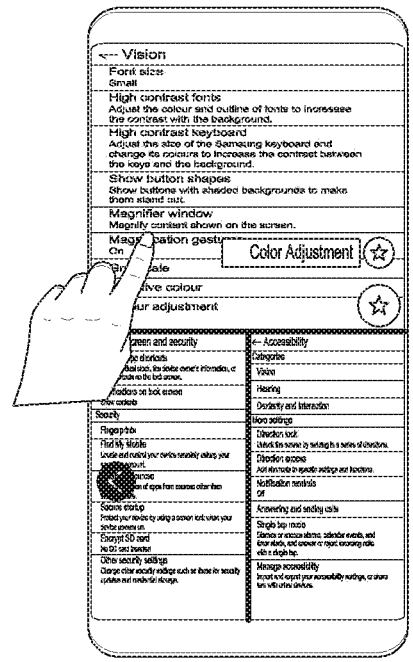
FIG.12C                FIG.12D

METHOD AND SYSTEM FOR MANAGING AND DISPLAYING APPLICATION

CROSS-REFERENCE TO RELATED APPLICATION(S)

This application is based on and claims priority under 35 U.S.C. § 119(a) of an Indian Complete patent application Serial number 201741016339, filed on May 9, 2017, in the Indian Intellectual Property Office, the disclosure of which is incorporated by reference herein in its entirety.

TECHNICAL FIELD

The disclosure relates to an electronic device. More particularly, the disclosure relates to a method and system to manage traversing across multiple user interface layers in a hierarchy of an application.

BACKGROUND

Applications for an electronic device are not restricted to just a few pages or layers. Most of the applications many states that can be navigated or represented in a hierarchical manner, so that a user must provide multiple interactions with the electronic device in order to traverse the hierarchy of the application.

FIG. 1A is an illustration of traversing across multiple user interface layers according to the related art.

Referring to FIG. 1A, in the related art, a framework maintains a stack of previously visited states. The previously visited states can be navigated/back by performing a gesture or action (e.g., pressing a back button on the application) which pops the stack and puts the last visited state forward on a display screen. Further, only one state is visible to the user at a particular time and previously visited states are hidden from view which can be made visible by performing the gesture or the action on the application. The user must input multiple interactions with the electronic device if the user must go to some previously traversed state or to next states which are within the hierarchy. For example, as illustrated in FIG. 1A, if the user has to go from an $n^{th}$ state to a $1^{st}$ state, then the user must press the back button (n−1) times.

Thus, it is desired to address the above-mentioned disadvantages or other shortcomings.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system to manage traversing across multiple user interface layers in a hierarchy of an application.

Another aspect of the disclosure is to display a first user interface layer of the application on a display screen of the electronic device.

Another aspect of the disclosure is to detect an input performed on a graphical element displayed within the first user interface layer to traverse to a second user interface layer of the application.

Another aspect of the disclosure is to display a graphical user interface including the first user interface layer, the second user interface layer and an indicia indicating a relation between the first user interface layer and the second user interface layer in the hierarchy on the screen of the electronic device.

Another aspect of the disclosure is to detect an input performed on a graphical element displayed within the second user interface layer to traverse to a third user interface layer of the application.

Another aspect of the disclosure is to display a graphical user interface comprising the first user interface layer, the second user interface layer, the third user interface layer, and an indicia indicating a relation among the first user interface layer, the second user interface layer and the third user interface in the hierarchy on the screen of the electronic device.

Another aspect of the disclosure is to dynamically arrange the first user interface layer, the second user interface layer, and the third user interface layer based on a rule.

Another aspect of the disclosure is to dynamically remove at least one user interface layer based on the rule and the hierarchy.

Another aspect of the disclosure is to detect an input performed on the graphical component to display relevant user interface layers of the application.

Another aspect of the disclosure is to display the relevant user interface layers of the application in the hierarchy.

Another aspect of the disclosure is to detect the user interface layer from the displayed relevant user interface layers selected by a user.

Another aspect of the disclosure is to directly display the selected user interface layer by skipping intermediate user interface layers in the hierarchy.

Another aspect of the disclosure is to display a relation between the first user interface layer and the second user interface layer in the hierarchy by performing a gesture on the indicia.

In accordance with an aspect of the disclosure, a method of traversing across multiple user interface layers in an application by an electronic device, the method comprises displaying a first user interface layer of the application on a screen of the electronic device; detecting an input on a first graphical element displayed within the first user interface layer; and displaying, on the screen, the first user interface layer, a second user interface layer of the application, and at least one first indicia indicating a relation between the first user interface layer and the second user interface layer based on the input to traverse to the second user interface layer.

In another embodiment, a method of traversing across multiple user interface layers in an application by an electronic device, the method comprises displaying a graphical user interface comprising a plurality of graphical elements, each of the plurality of graphical elements corresponding to a user interface layer of the application traversed by a user input; identifying a selected graphical element from the plurality of graphical elements based on a user input; and displaying a user interface layer corresponding to the selected graphical element.

In another embodiment, an electronic device to manage traversing across multiple user interface layers in a hierarchy of an application, the electronic device comprises a memory, and at least one processor configured to control a display to display a first user interface layer of the application on the screen, detect an input a graphical element displayed within the first user interface layer, and control the display to display, on the screen, the first user interface layer, a second user interface layer of the application, and at least one first indicia indicating a relation between the first user interface layer and the second user interface layer based on the input to traverse to the second user interface layer.

In another embodiment, an electronic device of traversing across multiple user interface layers in an application, the electronic device comprises a memory, and at least one processor configured to control display, a graphical user interface comprising a plurality of graphical elements, each of the plurality of graphical elements corresponding to a user interface layer of the application traversed by a user input, identify a selected graphical element from the plurality of graphical elements based on a user input, and control the display to the display, a user interface layer corresponding to the selected graphical element.

In another embodiment, an non-transitory computer-readable storage medium is configured to store one or more computer programs including instructions that, when executed by at least one processor, cause the at least one processor to perform the method of claim 1.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 12A, 12B, 12C, 12D, 12E, 12F, 12G, 12H, 12I, and 12J illustrate examples of hierarchical relationship between user interfaces of settings of a native application according to an embodiment of the disclosure;

Throughout the drawings, it should be noted that like reference numbers are used to depict the same or similar elements, features, and structures.

DETAILED DESCRIPTION

Figure 1A:
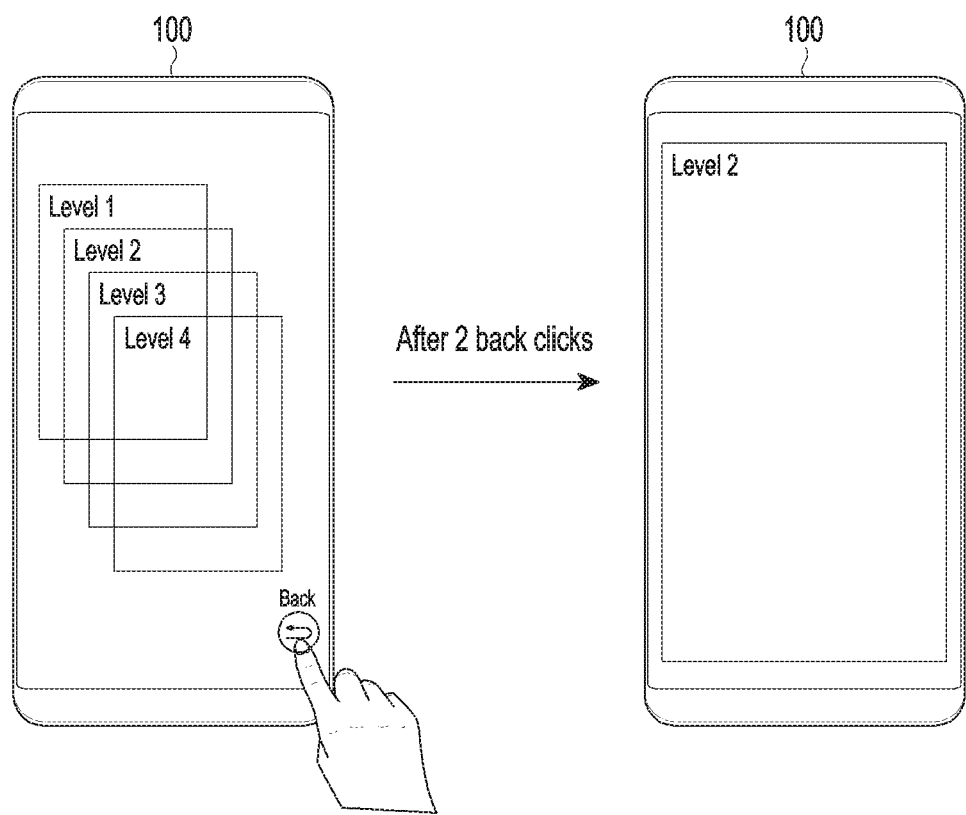
FIG. 1A is an illustration of traversing across multiple user interface layers according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As disclosed, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate such as printed circuit boards and the like. The circuits may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments herein disclose a method to manage traversing across multiple user interface layers in a hierarchy of an application. The method includes causing, by a traverse manager, to display a first user interface layer of the application on a screen of the electronic device. Further, the method includes detecting, by the traverse manager, an input performed on a graphical element displayed within the first user interface layer to traverse to a second user interface layer of the application. Further, the method includes causing, by the traverse manager, to display a graphical user interface comprising the first user interface layer, the second user interface layer and at least one indicia indicating a relation between the first user interface layer and the second user interface layer on the screen of the electronic device in the hierarchy.

Unlike the methods and systems according to the related art, the disclosure can be used to display and traverse to the various levels of active states of an application while maintaining the hierarchical relationship of the application. The disclosure allows the user of the electronic device to traverse the hierarchy or navigate back and forth in the application with less user-device interaction. Further, the user of the electronic device may interact with the previously traversed states immediately as the states are maintained on the user interface of the electronic device.

In an example, the user may reach from an $n^{th}$ state to a $1^{st}$ state with just one interaction. This saves time of the user and the method enhances the user friendliness and usability of the application.

The disclosure also allows the user of the electronic device to have extremely easy navigation inside an application and allows the user of the electronic device to multi-task by keeping multiple states of the application visible and operable by the user. The user navigation is made extremely easy as the user can shift to any previous activity with minimum user interaction and burden, so as to enhance the user experience.

The disclosure does not require remote storage to achieve the improved user interface. Further, all states which are visible to the user or can be made visible by performing a gesture (e.g., swiping left-right) in the list are kept in a primary memory. Further, if the user is visiting a state lower the hierarchy of the application, the user is very likely to come back to parent states. Further, the unwanted states, which are part of different active states, are intelligently removed based on rules defined in the electronic device for the purpose of memory management.

The disclosure can be used to display the hierarchical relationship in an intuitive manner which is easily understandable so that the user always know which activity is opened from which one. The hierarchical relationship allows the user to navigate from any previous activity with minimum user interaction, which makes it user friendly and improves navigation across the hierarchy.

The disclosure allows the user of the electronic device to interact with multiple active states at a single time and traverses through multiple active states in a manner which requires less interaction of the user. The disclosure allows the user of the electronic device to display and traverse among the multiple screens within the application while displaying the hierarchical relationship between multiple screens in an intuitive way. The screens may be represented by nodes of the hierarchical relationship and may be referred to as screens, layers, or pages.

The disclosure does not store the hierarchy of the application and make hierarchy as the user interacts with the user interface. The disclosure assists the user to take advantages of opening the certain activities of the application together to make the use of the application simpler. The hierarchy of application is dynamically determined as the user traverses the application and is displayed in a fashion to simply user navigation.

In the disclosure, the application itself is not notified of any changes that are required to display multiple active states together.

The disclosure allows the user of the electronic device to easily navigate within the application based on the application provided input (e.g., a suggestion or the like). In an example, if a shopping application displays an offer (e.g., 50% off) corresponding to a product (e.g., a laptop or the like), and the user of the electronic device wants to explore the details of the offer corresponding to the product, then the user of the electronic device clicks the graphical element corresponding to the offer. Based on clicking the graphical element, the electronic device can directly navigate to the offer related to the user interface of the shopping application by skipping the intermediate activities (i.e., intermediary nodes of the hierarchy). This results in enhancing the user experience.

FIGS. 1B through 25 illustrate various embodiments of the disclosure and, to simplify the disclosure, similar reference numbers are used to depict the same or similar elements, features, and structures.

Figure 1B:
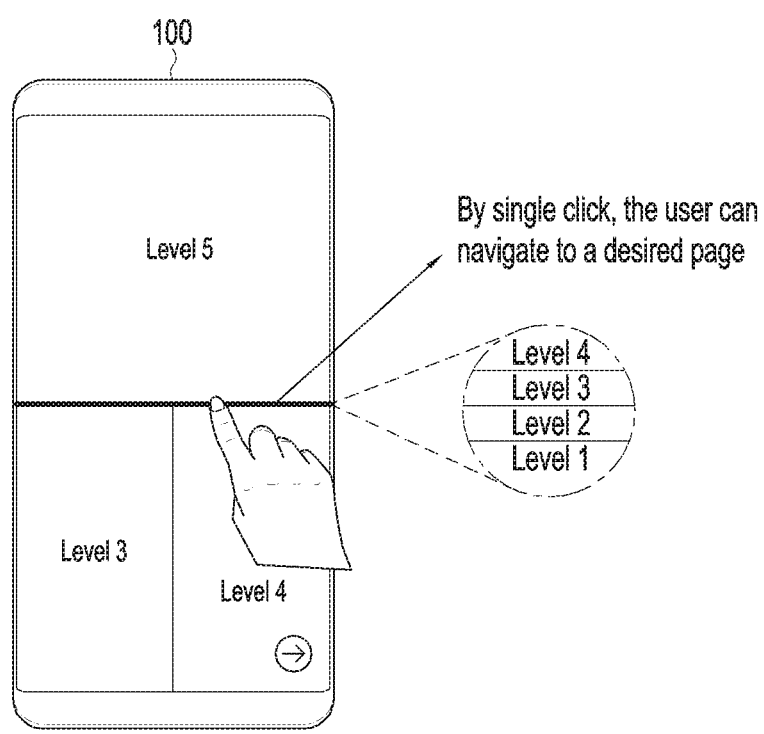
FIG. 1B is an overview of an electronic device to manage traversing across multiple user interface layers of an application according to an embodiment of the disclosure.

FIG. 1B is an overview of an electronic device to manage traversing across multiple user interface layers of an application according to an embodiment of the disclosure.

In an embodiment, the user interface layers described herein may, non-exclusively refer to any interconnected regions or portions or node of the application. For example, in a social networking application, the user interface layers can be a timeline page, a status page, a friend's timeline, a setting page, an images page, a chatting window, or the like. Similarly, for a web-based application, the user interface layers can be an interconnected tab, sub tabs, a web page, sub-web pages, window within a web page, or the like. Similarly, in a movie ticket booking application, the user interface layers can be a home page, a booking page, a seat availability page, my bookings page, a profile page, or the like.

Referring to FIG. 1B, an electronic device 100 displays a first user interface layer of the application on a display screen. Further, the electronic device 100 is configured to detect an input performed on a graphical element displayed within the first user interface layer to traverse to a second user interface layer of the application. In an embodiment, the input is received by performing any gesture on the graphical element. The gesture can be, for example but not limited to, a swipe gesture, a long press, a pinch gesture, a zoom-in, a zoom-out, or the like. In an embodiment, each of the user interface layers of the application comprises graphical elements and scrollable components for interaction.

After detecting the input performed on the graphical element displayed within the first user interface layer, the electronic device 100 is configured to display a graphical user interface including the first user interface layer, the second user interface layer, and an indicia indicating a relation between the first user interface layer and the second user interface layer in the hierarchy on the display screen. In an embodiment, the graphical user interface is a type of the user interface that enables the user to interact with the application through a multimedia object, including, for example, an icon, a button, a menu, an image, a video, an audio, or the like.

In an example, the indicia can be, for example, but is not limited to, a color bar, an icon, n-polygons, circular shaped arrows, triangular, or the like.

In an embodiment, the user interface may include any number of components. The user interface components may represent or correspond to various layers of applicable types. In an embodiment, the user interface components may be arranged in the hierarchy and presented to the user according to the structure of the hierarchy. In an embodiment, the user interface components' hierarchical structure corresponds to the hierarchical structure of the layers the user interface components represent. The user interface hierarchy may include any number of layers, and at each layer, there may be any number of user interface components. Relationships may exist among specific user interface components, and the positions of the individual user interface components within the user interface hierarchy may indicate specific relationships among these components. When the user interface is presented to the user, the user may navigate between user interface layers or user interface components as well as interact with the user interface components.

Further, layers of the user interface may be arranged in a hierarchy. In an embodiment, the layers of the user interface may be organized into the hierarchy based on how the individual layers are related to each other. The hierarchy may have any number of levels, and at each level, there may be any number of layers. A parent-child or sibling relationships may exist between specific layers in the hierarchy. Within the hierarchy, the parent layer is one level above the level of its child layer. Two sibling layers are at the same level and share the same parent layer. The layers and its children, siblings, or both may form a group within the hierarchy.

In an embodiment, the electronic device 100 is configured to detect an input performed on a graphical element displayed within the second user interface layer to traverse to a third user interface layer of the application. After detecting the input performed on the graphical element displayed within the second user interface layer, the electronic device 100 is configured to display a graphical user interface including the first user interface layer, the second user interface layer, the third user interface layer, and an indicia indicating a relation among the first user interface layer, the second user interface layer and the third user interface in the hierarchy on the display screen.

In an example, when the user of the electronic device 100 clicks on the user interface (which may also be referred to as a layer, a node, or a page) of a current activity on the application, then the activity page is displayed in a lower half portion and the next activity (i.e., an activated new activity) that can be displayed as result of click or any other action can be shown in the upper half portion of the display screen. This dynamically layers pages or screens that are shown on the user interface of the electronic device 100 to allow a user to view the hierarchal nature of the application. Further, the activity that is not related to the current activity cannot be shown on the display screen and can be cleared off from the current displayed user interface to save memory.

In an example, the relationship between different user interface activities can be shown using the indicia such as colored bars on the top portion of the individual activity. However this relation depiction can be implemented by various procedures.

In an embodiment, the first user interface layer, the second user interface layer and the third user interface layer are dynamically arranged based on rules.

In an embodiment, the rules can be described as in below table 1.

TABLE 1

| Rule No. | Description |
|---|---|
| 1 | Any new layer X can be opened in an upper half portion of the display screen. |
| 2 | For any layer X which is to be displayed on the upper half portion of the display screen, the layers (e.g., pages, nodes or the like) that can be visible in a bottom half of the display screen include:<br>a) All already opened siblings of layer X.<br>b) All layers present on a path from root to layer X.<br>c) Siblings of an immediate parent layer |
| 3 | This rule describes the order in which the pages can be displayed in the bottom half of the display screen:<br>a) If some siblings of layer X are visible or already opened, then immediate parent of layer X navigates to the leftmost sibling of layer X.<br>b) If no siblings of layer X are already opened then immediate parent of layer X navigates to the rightmost part of the list |

In an embodiment, the rules can be defined based on an application context and a screen size of the electronic device 100.

In an embodiment, the rules can be defined by an original equipment manufacturer (OEM).

In an embodiment, the rules can be defined by the user of the electronic device 100.

In an embodiment, the electronic device 100 is configured to dynamically remove one or more user interface layers based on the rule and the hierarchy.

In an embodiment, the electronic device 100 is configured to display the graphical component within the graphical user interface. Further, the electronic device 100 is configured to detect the input performed on the graphical component to display relevant user interface layers of the application. The relevant user interface layers are determined based on frequently visiting a specific user interface layer. Based on detecting the input performed on the graphical component to display relevant user interface layers of the application, the electronic device 100 is configured to display the relevant user interface layers of the application in the hierarchy.

Further, the electronic device 100 is configured to detect the user interface layer from the displayed relevant user interface layers selected by the user. After detecting the user interface layer from the displayed relevant user interface layers selected by the user, the electronic device 100 is configured to directly display the selected user interface layer by skipping intermediate user interface layers in the hierarchy.

In an example, the most used options by the user which may be collected by the usage frequency of that option or prioritized states of the application provided by the application can be shown when the user visits the specific pages on the display screen. For example, in an e-commerce application, if the user frequently visits a certain product to check its price and specifications etc., then that product can be predicted when the user visits again. In another example, whenever there is a deal on a new product, the application can show the deal in the graphical element in the e-commerce application.

In this case, the disclosure allows the user to directly navigate to the most visited options by skipping intermediate nodes of the hierarchy. This improves the user experience.

In an embodiment, the relation between the first user interface layer and the second user interface layer in the hierarchy is displayed by performing the gesture on the indicia.

In an embodiment, the electronic device 100 is configured to display the graphical user interface including a plurality of graphical elements each corresponding to the user interface layer of the application traversed by the user in the hierarchy. Further, the electronic device 100 is configured to detect the graphical element from the plurality of graphical elements selected by the user. After detecting the graphical element from the plurality of graphical elements selected by the user, the electronic device 100 displays the user interface layer corresponding to the selected graphical element.

For example, the application may be closed due to some system error (e.g., an application level force close), or may be closed due to the user exiting the application. In this case, the user may want to begin work from the same place or may be from some intermediate activity present in the path of the previously opened activity, then an overlay can be shown for some time at some part of the display screen like a bottom part of the display screen, which shows in some interactive manner all the intermediate activities that the user traversed in order to reach that last activity before the app was closed. This allows the user to change anything in the intermediate activities like address or product in the application or navigate directly to the last activity. This can be easily done as the disclosure already maintains the most recent visited activities.

In an embodiment, the electronic device 100 is configured to maintain the layers of the user interface of a stack in the active states displayed on different divisions made on the display screen.

In an embodiment, when the action or gesture is a command to open a new activity on the display screen, the electronic device 100 keeps the previous display as-is and moves the previous display to the bottom half of the display screen. The new activity can be opened in the upper half portion of the display screen. This results in concurrently displaying multiple states.

The electronic device 100 arranges the activities in the list according to the rule. Further, electronic device 100 can be configured to display the hierarchical relationship between the activities according to the relationship in the hierarchy. Further, the electronic device 100 is configured to provide a final view that can be rendered on the display screen based on the rules.

The electronic device 100 is configured to display the multiple active states at a time for a particular hierarchical relation (i.e., maintaining the hierarchical relation using intelligent removal of unwanted states) and at the same time navigating through them. Further, the electronic device 100 is configured to display the multiple active screens at the same time, so as to allow the user to easily switch between multiple screens.

In an embodiment, when a certain option from a certain parent layer in the hierarchy is accessed (e.g., by clicking on the option), then only the parent and siblings activity of layers of that clicked option remain in the bottom portion of the display screen and other activities can be automatically cleared to improve the memory management of the electronic device 100.

In an example, if the user of the electronic device 100 is at some level of the application and then the user wishes to go backwards, then the user can either perform an action like a double finger tap on a previous user interface activity shown on the display screen to directly navigate to that previous activity. In an example, the user of the electronic device 100 may be on the $n^{th}$ level and then the user perform the gesture on the indicia, then the indicia can zoom-in and the user can select any relevant user interface in order to navigate to that relevant user interface by a single click thus preventing user from clicking the back button (n–1) times.

Although FIG. 1B shows the limited overview of the electronic device 100, it is to be understood that other embodiments are not limited thereto. Further, the electronic device 100 can include any number of indicia and displays screen. Further, the electronic device 100 can include any number of hardware or software components communicating with each other. By way of illustration, both an application running on a device and the device itself can be a component.

Figure 2A:
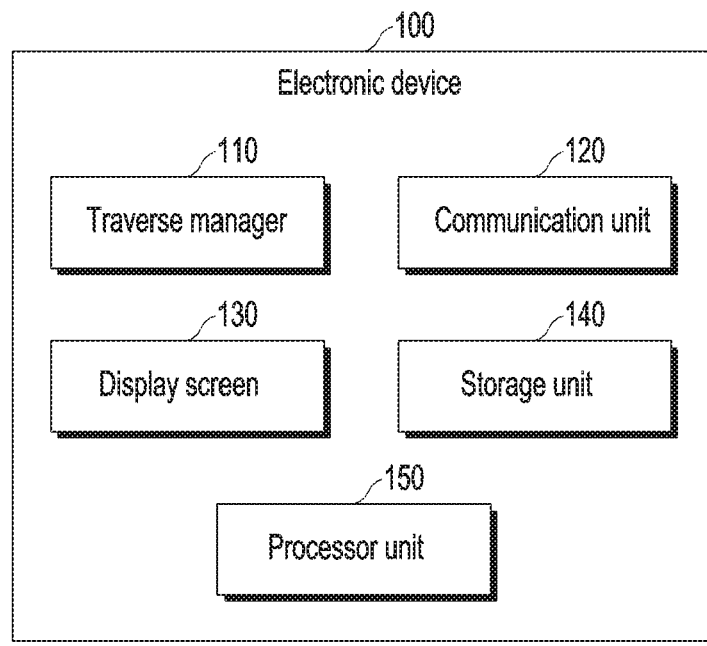
FIG. 2A is a block diagram of an electronic device according to an embodiment of the disclosure.

FIG. 2A is a block diagram of an electronic device according to an embodiment of the disclosure.

Referring to FIG. 2A, the electronic device 100 includes a traverse manager 110, a communication unit 120, a display screen 130, and a storage unit 140. The traverse manager 110 is in communication with the communication unit 120, the display screen 130, the storage unit 140 and a processor unit 150.

The display screen 130 displays the first user interface layer of the application. The traverse manager 110 is configured to detect the input performed on the graphical element displayed within the first user interface layer to traverse to the second user interface layer of the application. After detecting the input performed on the graphical element displayed within the first user interface layer, the traverse manager 110 is configured to display the graphical user interface including the first user interface layer, the second user interface layer, and the indicia indicating a relation between the first user interface layer and the second user interface layer in the hierarchy on the display screen 130.

In an embodiment, the traverse manager 110 is configured to detect the input performed on the graphical element displayed within the second user interface layer to traverse to the third user interface layer of the application. After detecting the input performed on the graphical element displayed within the second user interface layer, the traverse manager 110 is configured to display the graphical user interface including the first user interface layer, the second user interface layer, the third user interface layer and the indicia indicating a relation among the first user interface layer, the second user interface layer, and the third user interface in the hierarchy on the display screen 130.

In an embodiment, the first user interface layer, the second user interface layer, and the third user interface layer are dynamically arranged based on the rules defined by the traverse manager 110. In an embodiment, the traverse manager 110 is configured to dynamically remove one or more user interface layers based on the rules and the hierarchy.

In an embodiment, the traverse manager 110 is configured to display the graphical component within the graphical user interface. Further, the traverse manager 110 is configured to detect the input performed on the graphical component to display relevant user interface layers of the application. The relevant user interface layers are determined based on the user of the electronic device 100 frequently visiting the specific user interface layer. Based on detecting the input performed on the graphical component to display relevant user interface layers of the application, the traverse manager 110 is configured to display the relevant user interface layers of the application in the hierarchy. Further, the traverse manager 110 is configured to detect the user interface layer from the displayed relevant user interface layers that is selected by the user. After detecting the user interface layer from the displayed relevant user interface layers selected by the user, the traverse manager 110 is configured to directly display the selected user interface layer by skipping intermediate user interface layers in the hierarchy.

In an embodiment, the traverse manager 110 is configured to easily navigate within the application based on an application provided input. In an example, if an e-commerce application displays an offer (e.g., 70% off) corresponding to a product (e.g., a watch or the like), and the user of the electronic device 100 wants to explore the details of the offer corresponding to the product, then the user of the electronic device 100 selects the graphical element corresponding to the offer associated with the product. Based on selecting the graphical element, the electronic device 100 can directly navigate to the offer by skipping the intermediate activities (i.e., nodes in the hierarchy).

In an embodiment, the traverse manager 110 is configured to easily and automatically navigate within the user interface layers of the application based on a suggestion provided by the application. The suggestion may correspond to the offer, a sales trend, or the like.

In an embodiment, the traverse manager 110 is configured to display the graphical user interface including the plurality of graphical elements each corresponding to the user interface layer of the application traversed by the user in the hierarchy. Further, the traverse manager 110 is configured to detect the graphical element from the plurality of graphical elements selected by the user. After detecting the graphical element from the plurality of graphical elements selected by the user, the traverse manager 110 is configured to display the user interface layer corresponding to the selected graphical element.

The communication unit 120 is configured for communicating between internal units and with external devices via one or more networks. The storage unit 140 may include one or more computer-readable storage media. The storage unit 140 may include non-volatile storage elements. Examples of such non-volatile storage elements may include a magnetic hard disc, optical discs, floppy discs, flash memories, or forms of electrically programmable memories (EPROM) or electrically erasable and programmable (EEPROM) memories. In addition, the storage unit 140 may, in some examples, be considered a non-transitory storage medium. The term "non-transitory" may indicate that the storage medium is not embodied in a carrier wave or a propagated signal. However, the term "non-transitory" should not be interpreted that the storage unit 140 is non-movable. In some examples, the storage unit 140 can be configured to store larger amounts of information than a memory. In certain examples, a non-transitory storage medium may store data that can, over time, change (e.g., in random access memory (RAM) or a cache).

In an embodiment, the storage unit 140 may be a remote storage unit (e.g., cloud based storage), a storage within a storage area network, or any other remote storage unit.

Although FIG. 2A shows example units of the electronic device 100 but it is to be understood that other embodiments are not limited thereto. In other embodiments, the electronic device 100 may include a lesser or a greater number of units. Further, the labels or names of the units are used only for illustrative purpose and does not limit the scope of the disclosure. One or more units can be combined together to perform same or substantially similar function to manage traversing across multiple user interface layers in the hierarchy of the application on the display screen 130.

Figure 2B:
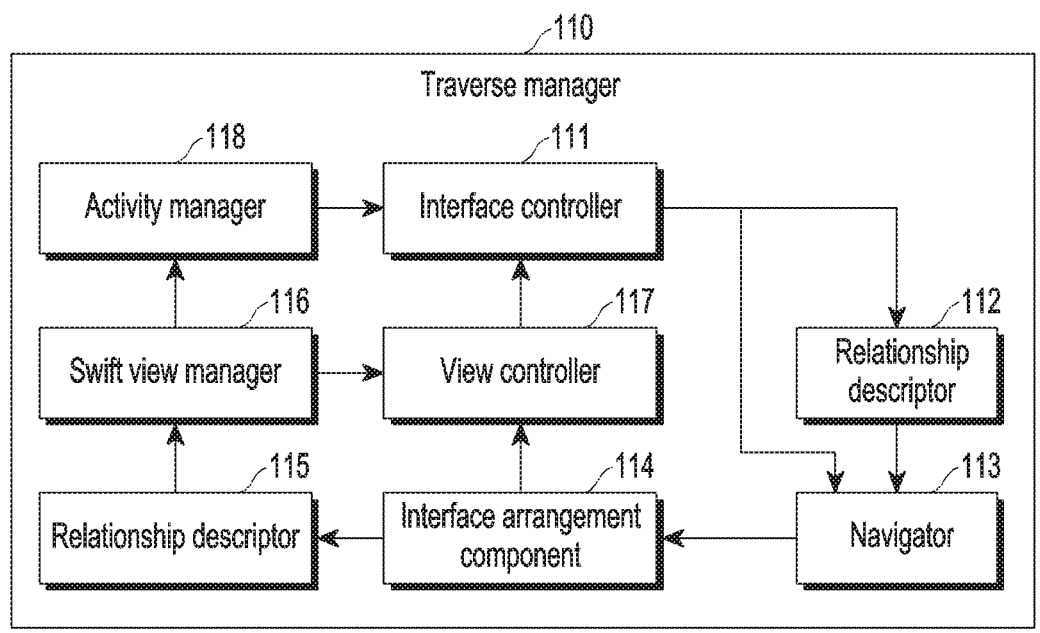
FIG. 2B is a block diagram of a traverse manager according to an embodiment of the disclosure.

FIG. 2B is a block diagram of a traverse manager according to an embodiment of the disclosure.

Referring to FIG. 2B, the traverse manager 110 includes an interface controller 111, a relationship descriptor 112, a navigator 113, an interface arrangement component 114, relationship descriptor 115, a swift view manager 116, a view controller 117, and an activity manager 118.

The interface controller 111 is configured to arrange an alignment of the user interface layers. The relationship descriptor 112 is configured to provide a relationship between the user interface layers. Based on the relationship between the user interface layers and the user input, the navigator 113 is configured to navigate and set the user interface layers on the display screen 130.

Further, the interface arrangement component 114 is configured to arrange the activities in the list according to the rules. Further, the relationship descriptor 115 is used for describing the hierarchical relationship between the activities according to the relationship in the hierarchy. The relationship descriptor 115 is configured to control the interaction of the user with the view of the display screen 130.

Further, the swift view manager 116 is configured to provide a final view that can be rendered on the display screen 130. Further, the swift view manager 116 is configured to enable a swift view mode. The swift view mode automatically displays the graphical user interface including the plurality of user interface layers of the application to traversing across multiple user interface layers in the hierarchy.

The activity manager 118 is configured to maintain the items of the stack in the active state displayed on different divisions made on the display screen 130. When the action or gesture is a command to open the new activity on the display screen 130, the activity manager 118 moves the previous display in the user interface (e.g., the bottom half of the display screen 130) and the new activity is opened in the user interface (e.g., the upper half portion of the display screen 130). This results in providing multiple states visible at once.

Although FIG. 2B shows example components of the traverse manager 110 but it is to be understood that other embodiments are not limited thereon. In other embodiments, the traverse manager 110 may include a lesser or greater number of components. Further, the labels or names of the components are used only for illustrative purpose and does not limit the scope of the disclosure. One or more units can be combined together to perform a same or substantially similar function to manage traversing across multiple user interface layers in the hierarchy of the application on the display screen 130.

Figure 3:
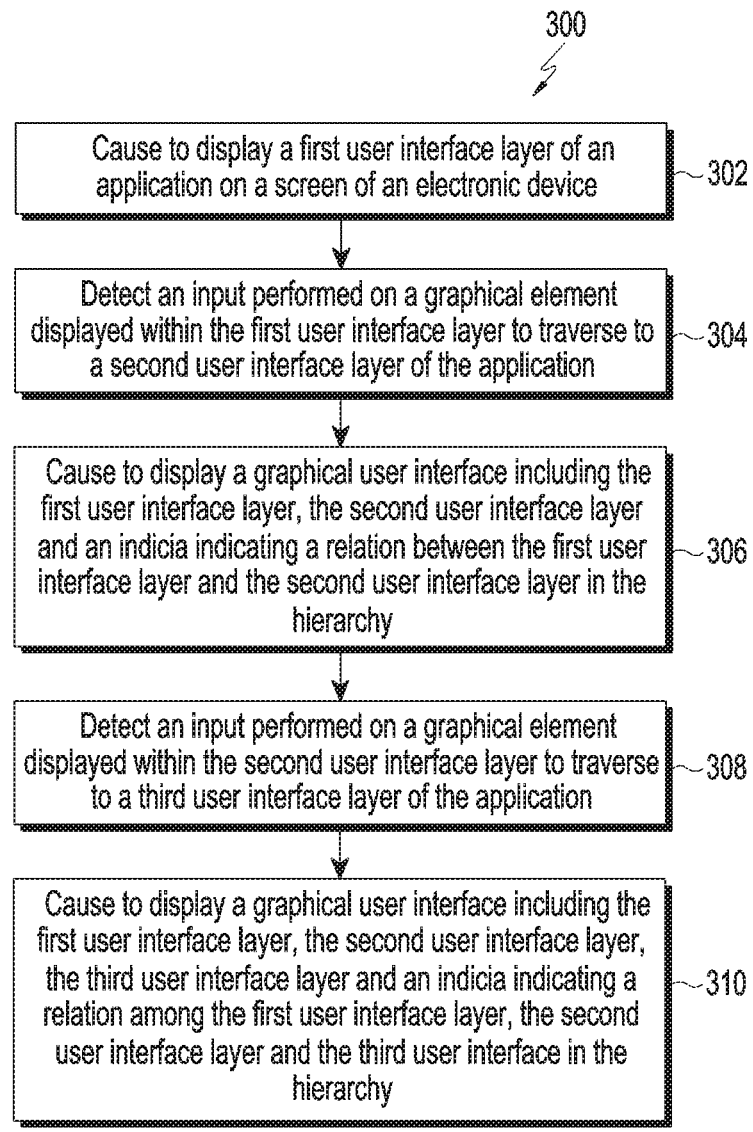
FIG. 3 is a flow diagram illustrating a method to manage traversing across multiple user interface layers in a hierarchy of an application according to an embodiment of the disclosure.

FIG. 3 is a flow diagram illustrating a method to manage traversing across multiple user interface layers in a hierarchy of an application according to an embodiment of the disclosure.

Referring to FIG. 3, a flow diagram 300 of an example method is illustrated. At operation 302, the method includes causing to display the first user interface layer of the application on the display screen 130 of the electronic device 100. In an embodiment, the method allows the traverse manager 110 to display the first user interface layer of the application on the display screen 130 of the electronic device 100.

At operation 304, the method includes detecting the input performed on the graphical element displayed within the first user interface layer to traverse to the second user interface layer of the application. In an embodiment, the method allows the traverse manager 110 to detect the input performed on the graphical element displayed within the first user interface layer to traverse to the second user interface layer of the application.

At operation 306, the method includes causing to display the graphical user interface comprising the first user interface layer, the second user interface layer and the indicia indicating the relation between the first user interface layer and the second user interface layer in the hierarchy on the display screen 130. In an embodiment, the method allows the traverse manager 110 to display the graphical user interface including the first user interface layer, the second user interface layer and the indicia indicating the relation between the first user interface layer and the second user interface layer in the hierarchy on the display screen 130.

At operation 308, the method includes detecting the input performed on the graphical element displayed within the second user interface layer to traverse to the third user interface layer of the application. In an embodiment, the method allows the traverse manager 110 to detect the input performed on the graphical element displayed within the second user interface layer to traverse to the third user interface layer of the application.

At operation 310, the method includes causing to display the graphical user interface including the first user interface layer, the second user interface layer, the third user interface layer and the indicia indicating a relation among the first user interface layer, the second user interface layer, and the third user interface in the hierarchy on the display screen 130 of the electronic device 100. In an embodiment, the method allows the traverse manager 110 to display the graphical user interface including the first user interface layer, the second user interface layer, the third user interface layer and the indicia indicating the relation among the first user interface layer, the second user interface layer, and the third user interface in the hierarchy on the display screen 130 of the electronic device 100.

The disclosure can be used to display and traverse to the $n^{th}$ level of the active state of the application while maintaining hierarchical relationship, along with keeping active all the traversed states of the same application for quick and easy access to all the traversed states of that application. In an example, displaying some indicative depiction for example, color bars on the top of each active individual state (i.e., labels) show a relationship between the different user interface elements for example, a parent, a child and siblings user interface elements. This type of display and navigation can be of immense help to the user to reduce the number of interactions while traversing in the application.

The disclosure allows the user to traverse the hierarchy or navigate back and forth in the application with the less user-device interaction. In an example, the user can traverse from an $n^{th}$ state to a $1^{st}$ state with a single interaction.

Unlike the systems and methods according to the related art, the application itself is not notified of any changes that are required to display multiple active states together. The disclosure can provide an intelligent removal of unwanted active states, which is performed to declutter the user interface of the electronic device 100. As the current traversal path of the user shows that, the user might not visit some of the displayed previously traversed states.

The method can be used to manage traversing across multiple user interface layers in the hierarchy of the application based on, for example, an artificial intelligence (AI) technique, a machine learning technique, or the like.

The various actions, acts, blocks, operations, or the like in the flow diagram 300 may be performed in the order presented, in a different order or simultaneously. Further, in some embodiments, some of the actions, acts, blocks, operations, or the like may be omitted, added, modified, skipped, or the like without departing from the scope of the disclosure.

Figure 4A:
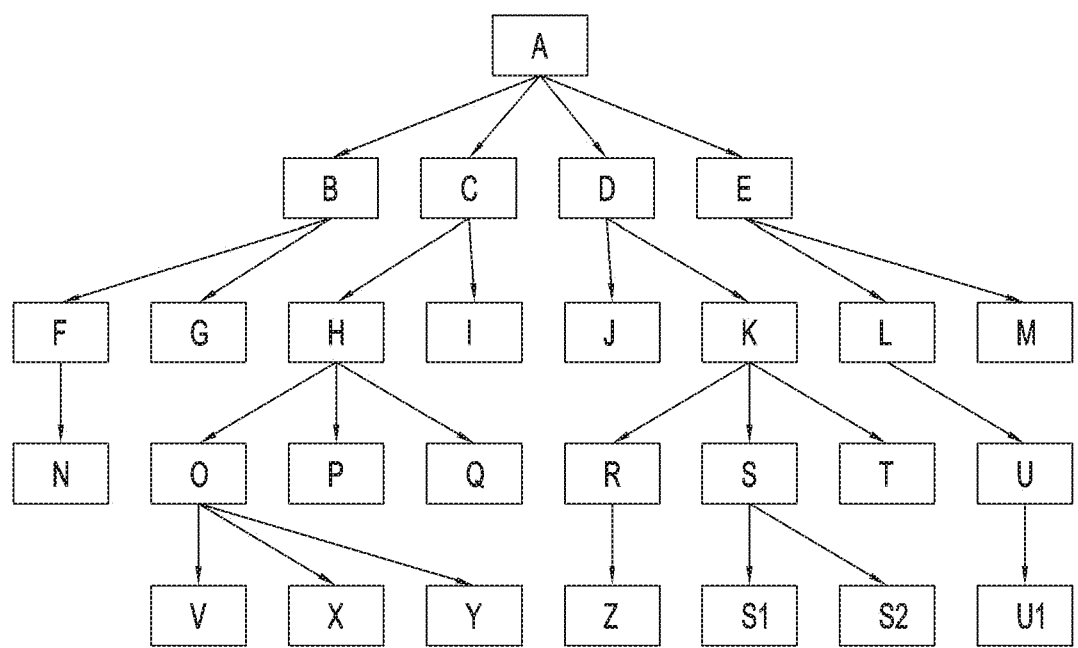
FIG. 4A illustrates an example of traversing a hierarchical user interface according to an embodiment of the disclosure.
Figure 4B:
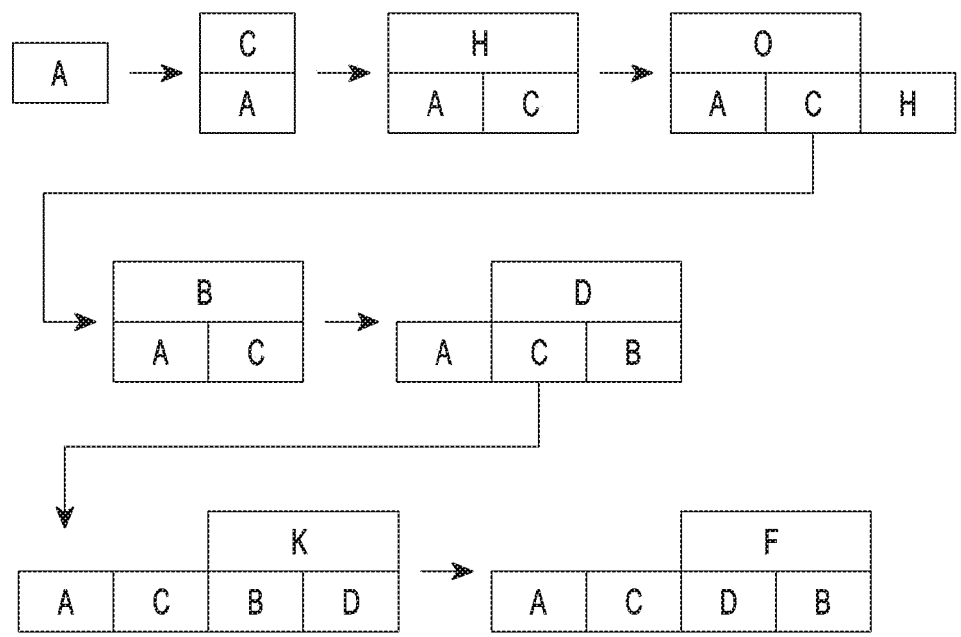
FIG. 4B illustrates a hierarchical display of user interfaces according to an embodiment of the disclosure.

FIG. 4A illustrates a hierarchical relationship between user interfaces according to an embodiment of the disclosure. FIG. 4B illustrates an example of traversing a hierarchical user interface according to an embodiment of the disclosure.

Referring to FIGS. 4A and 4B, the hierarchical relationship between the user interfaces is explained. In an example, consider, the user taps on C, using rule 1 and rule 3(b) (from table 1), C is shown in the upper half portion of the display screen 130. A is shown in the lower half portion of the display screen 130. Consider, if the user taps on H, using rule 1 and rule 3(b), H is shown in the upper half portion of the display screen 130. C is shifted to a rightmost side of the lower half portion of the display screen 130.

Further, if the user taps on O, then O is shown in the upper half portion of the display screen 130 using rule 1 and rule 3(a), then H is shifted to a rightmost side of the lower half portion of the display screen 130. Further, if the user taps on B from A, using rule 1, rule 2 and rule 3(a), B is shown in the upper half portion of the display screen 130. O and H are removed from the display screen 130 and A and C are positioned at the rightmost side and leftmost side of the lower half portion of the display screen 130.

Further, if the user taps on D, using rule 1 and rule 3(a), D is shown in the upper half portion of the display screen 130. B is shifted to the rightmost side of the lower half portion of the display screen 130. Further, if the user taps on K, using rule 1 and rule 3(b), K is shown in the upper half portion of the display screen 130. D is shifted to the rightmost side of the lower half portion of the display screen 130.

Further, if the user taps on F, using rule 1, rule 2, and rule 3(b), F is shown in the upper half portion of the display screen 130. K is removed from the display screen, B is shifted to the rightmost side of the lower half portion of the display screen 130.

Figure 5:
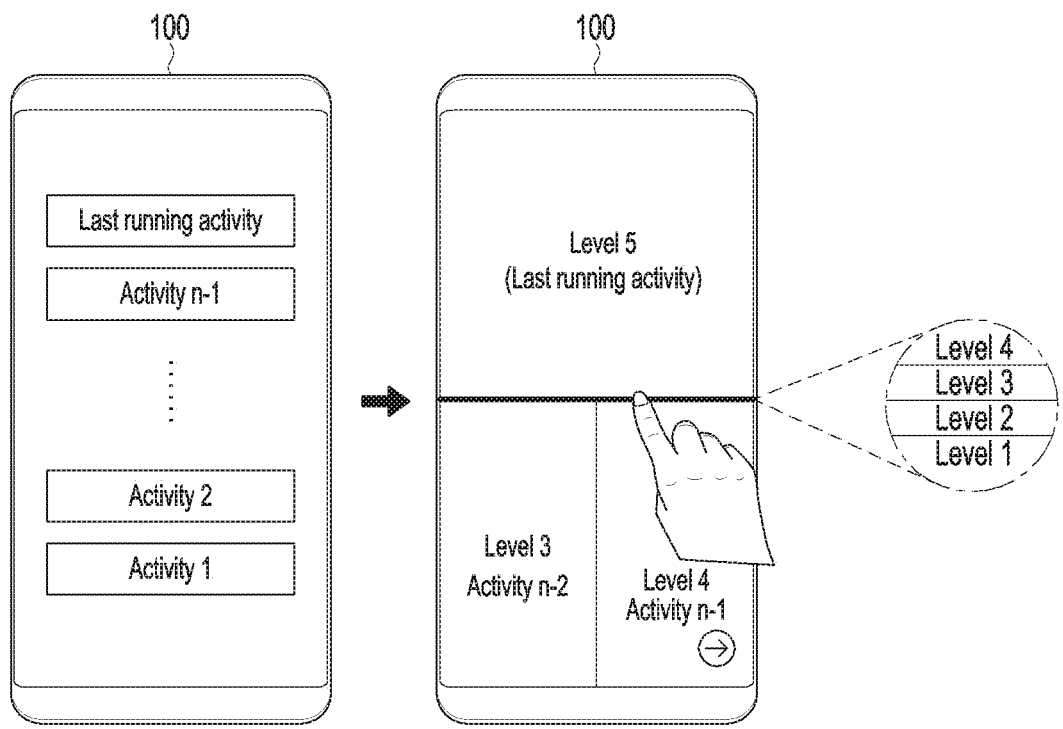
FIG. 5 is an example in which a relationship between user interfaces is explained based on an activity according to an embodiment of the disclosure.

FIG. 5 is an example in which a relationship between user interfaces is explained based on the activity according to an embodiment of the disclosure.

Referring to FIG. 5 when the action or the gesture which is a command to open the new activity is received on the display screen 130, then the activity manager 118 maintains the previous display and shifts the previous display in the lower half portion of the display screen 130 so that the new activity is opened in the upper half portion of the display screen 130 to make multiple states visible at once on the display screen 130.

Figure 6:
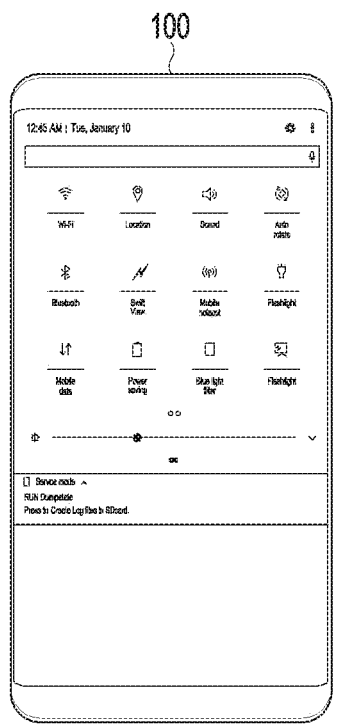
FIG. 6 is an example in which a swift view mode is integrated in a notification panel of an electronic device according to an embodiment of the disclosure.

FIG. 6 is an example in which a swift view mode is integrated in a notification panel of an electronic device according to an embodiment of the disclosure.

Referring to FIG. 6, the user of the electronic device can enable or disable the swift view mode on the notification panel. If the user enables the swift view mode on the notification panel, the traverse manager 110 configures the display screen 130 in the swift view mode. Based on enabling the swift view mode, the display screen 130 displays the graphical user interface including the plurality of user interface layers of the application in the hierarchy at a time.

Figure 7A:
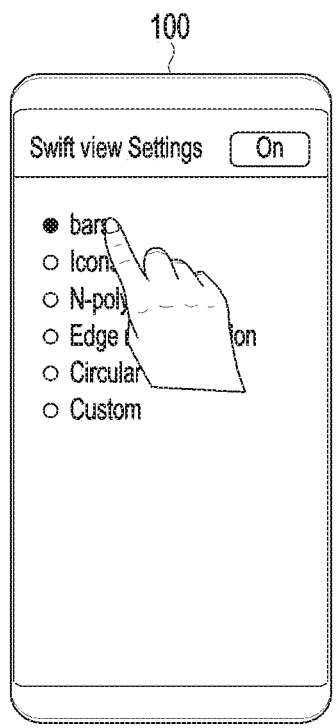
FIGS. 7A and 7B are examples in which various setting arrangements are explained for enabling a swift view mode according to an embodiment of the disclosure.
Figure 7B:
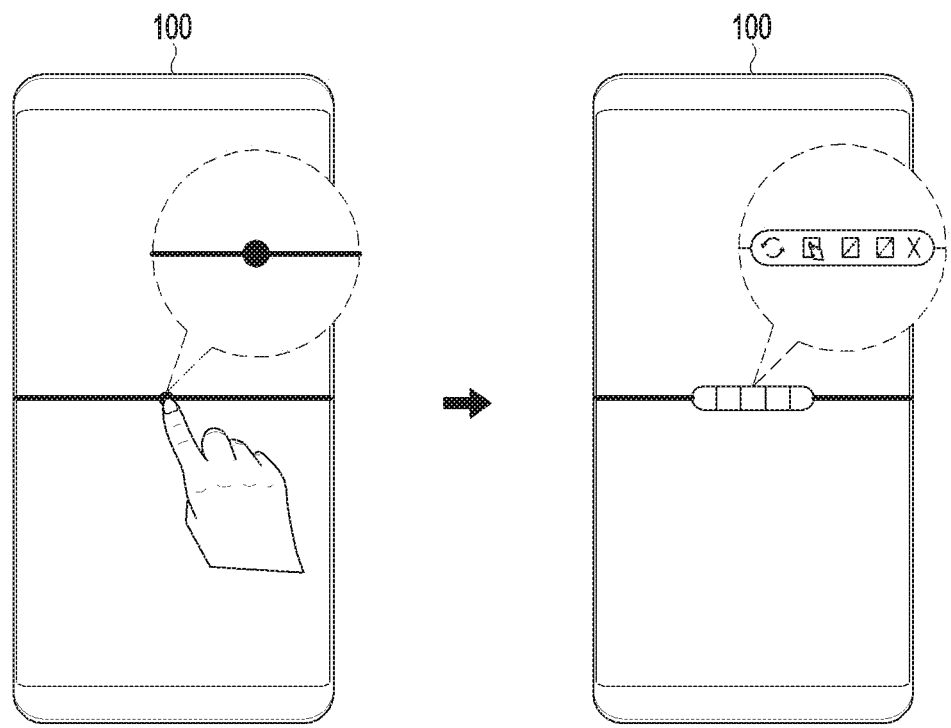

FIGS. 7A and 7B are examples in which various setting arrangements are explained for enabling a swift view mode according to an embodiment of the disclosure.

Referring to FIG. 7A, the user can be provided with options to turn on/off this feature (i.e., the swift view mode) according to their needs. After turning on the swift view mode, the user may easily navigate to one user interface layer to another user interface layer by the single click. Referring to FIG. 7B, the user can be provided with a button between switch to the swift view mode and a normal mode at any time.

In an embodiment, the user can switch to the swift view mode from the normal mode by dragging the horizontal divider on the display screen 130.

FIGS. 8A, 8B, 8C, and 8D are examples in which indicia are represented in various forms according to an embodiment of the disclosure.

Figure 8A:
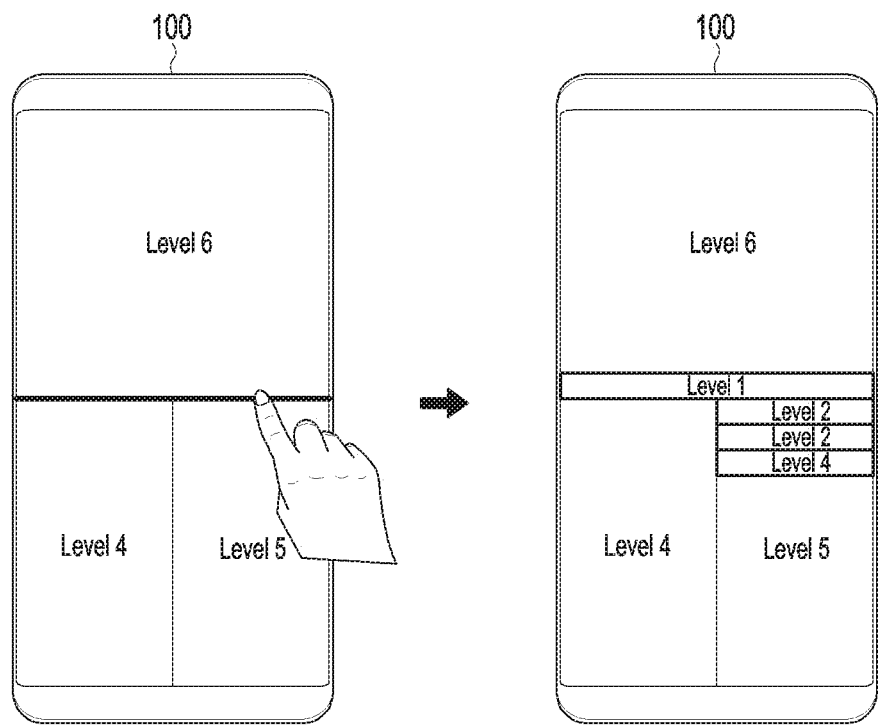
FIGS. 8A, 8B, 8C, and 8D are examples in which indicia are represented according to an embodiment of the disclosure.

Referring to FIG. 8A, in an example, a bar technique of relationship indication has different color bars extending from a parent layer to all its children. Every parent has its own well defined color, which extends across its children.

For any child at level n, it has n−1 color bars of its parent's hierarchy and one color bar of its own.

Siblings at a particular level, which are indicated by a different color of themselves, have the same color as the parent.

In a normal state, the color bars can be of visible height to visually show the hierarchy.

In a zoomed-in mode (which can be invoked by the gesture) color bars may change to show labels (i.e. the labels of all parent layers). Along with an increased width, the label is selectable to allow to the user to jump to the desired parent layer.

Figure 8B:
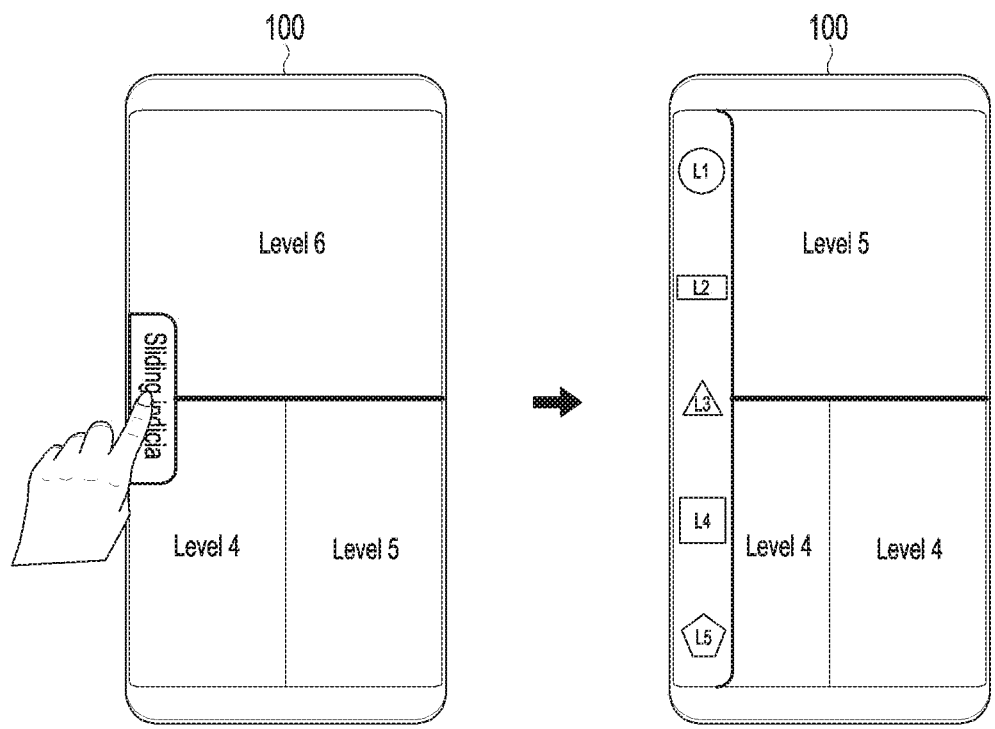

Referring to FIG. 8B, every parent can be associated with an n sided polygon figure. For example, a parent at level 1 can be associated with a circle, a parent at level 2 can be associated with a line, a parent at level 3 can be associated with a triangle, and a parent at level 4 can be associated with a quadrilateral and so on. Further, siblings at any level can be indicated by same n-polygon associated with the level, and be displayed adjacently with a different color (e.g., gray, or the like). For a layer at any level n, the hierarchy can be displayed by clicking the sliding drawer present at a set location on the user interface. In the displayed hierarchy, the intermediate layers on the path to layer n from the root layer can be shown at the level at which the intermediate layers are present. Clicking on any layer in the hierarchy can transfer the user to the desired layer.

Figure 8C:
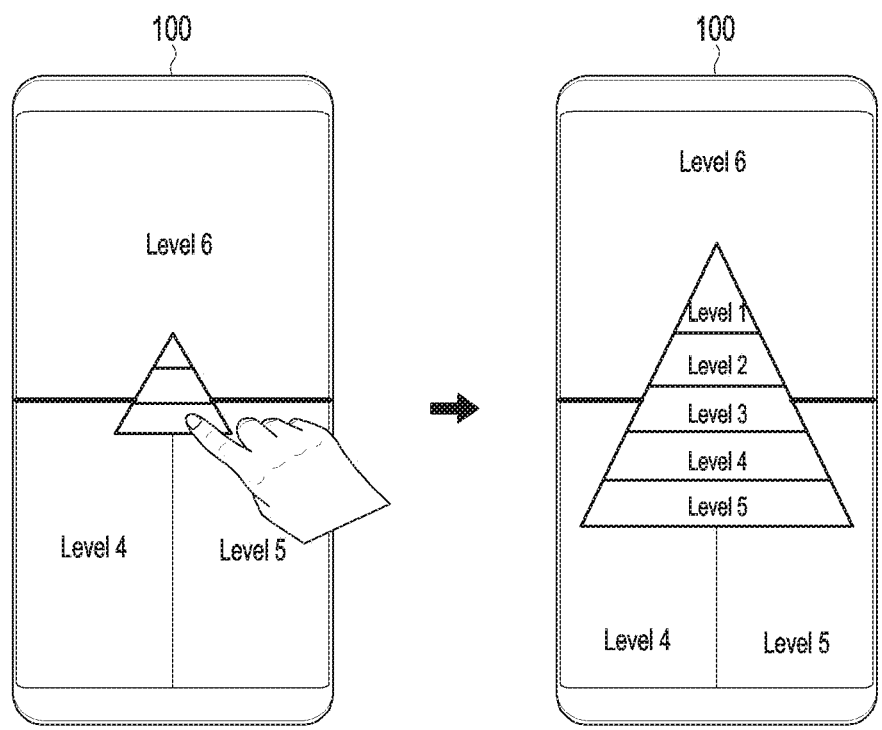

Referring to FIG. 8C, a polygonal figure which is divided into discrete layers (e.g., trapezoids or triangles) each capable to rotate on its own axis, representing layers at the particular level, can be used to indicate the hierarchy. The hierarchy for the particular layer n can be represented within the polygonal figure in which the layer for root layer can be at the bottom portion And followed by other layers leading to layer n stacked on the parent layer. The siblings at any level can be represented on different sides of one particular layer. Each layer is supposed to have n sides, and sides change visibility on rotation of that layer.

In the zoomed-in mode (which can be invoked by the gesture), the polygonal figure can zoom-in revealing parent labels. Clicking on any layer can navigate the user to their desired level.

Figure 8D:
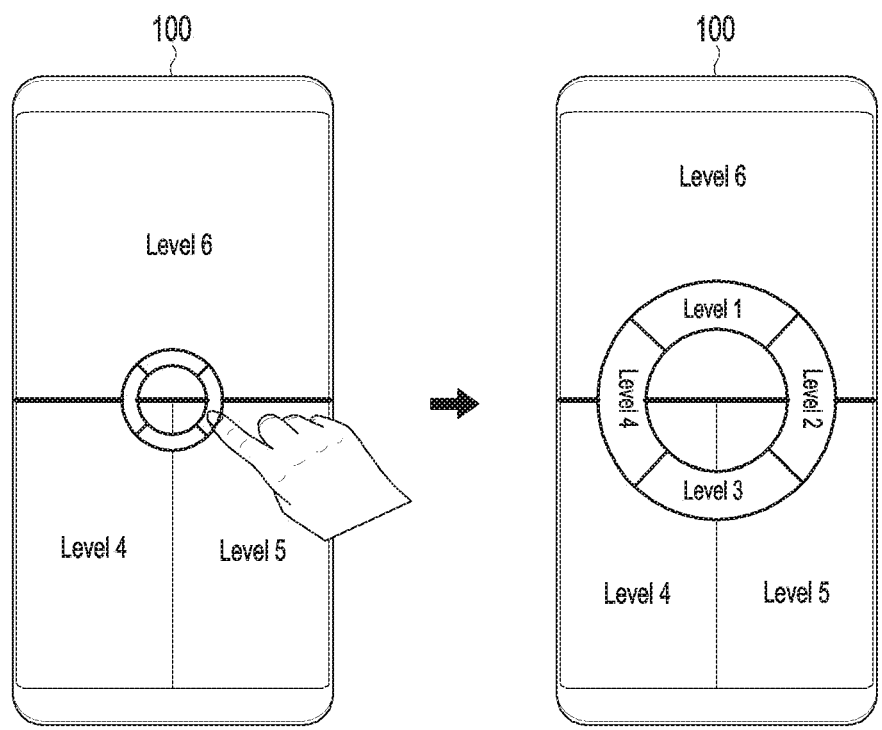

Referring to FIG. 8D, a circular figure is connected from end to end and can be used to represent the hierarchy. The circular figure can be divided into layers, each representing a particular level in the hierarchy. A Hierarchy starts with root layer making the first layer for the circular figure and is followed by all intermediate layers making continuous layers and completing the figure. As the level increases, layers reduce in size to accommodate more layers inside the circle. Siblings can be represented by sub layers of one particular layer of the circular figure at the level at which the siblings can be present. In the zoomed-in mode (which can be invoked by the gesture), the circular figure can zoom-in revealing parent labels. Selecting any layer can navigate the user to their desired level.

In an example, any layer at level n can be represented by an icon. For a layer at any level n, the hierarchy can be displayed by clicking a sliding drawer present at a set location on the user interface. In the displayed hierarchy, the intermediate layers on the path to layer n from the root layer can be shown at the level at which the intermediate layers are present. Clicking on any layer in the hierarchy can navigate the user to their desired level.

Further, the siblings at any level can be indicated by their own icon, displayed side-by-side at their own representative level.

An icon for any layer can be displayed by the following rules (in decreasing order of priority, the size of icons keeps on decreasing): (1) for any layer n, the application may provide an image to be used to identify that layer; (2) for a root layer, an application launcher icon can be used; and (3) for any intermediate layer for which an icon is not provided by the application, a representative icon can be created based on the first alphabet of the layer.

Figure 9:
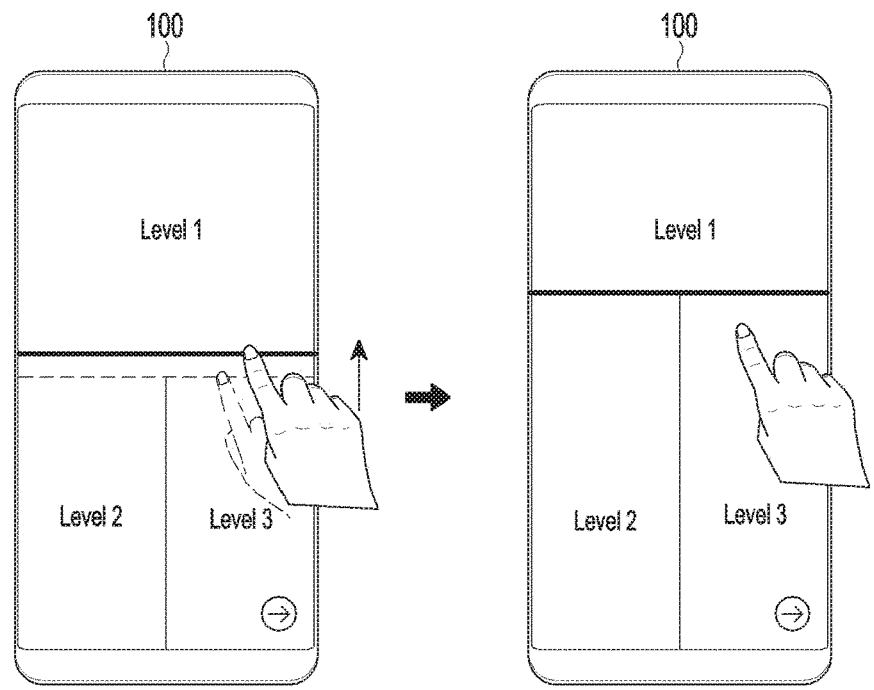
FIGS. 9 and 10 are examples in which modifying sizes of user interfaces is described according to an embodiment of the disclosure.
Figure 10:
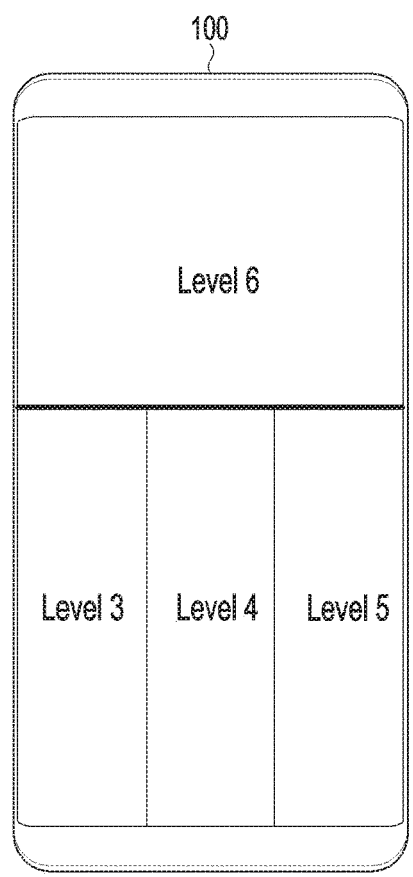

FIGS. 9 and 10 are examples in which modifying sizes of user interfaces is described according to an embodiment of the disclosure.

Referring to FIG. 9, the user can drag a divider between the partitions according to their ease in both vertical and horizontal partitions. Referring to FIG. 10, the user can be provided with an option to configure the number of partitions to be shown in the lower half portion. The electronic device 100 with big display screen size can have even more partitions.

Figure 11:
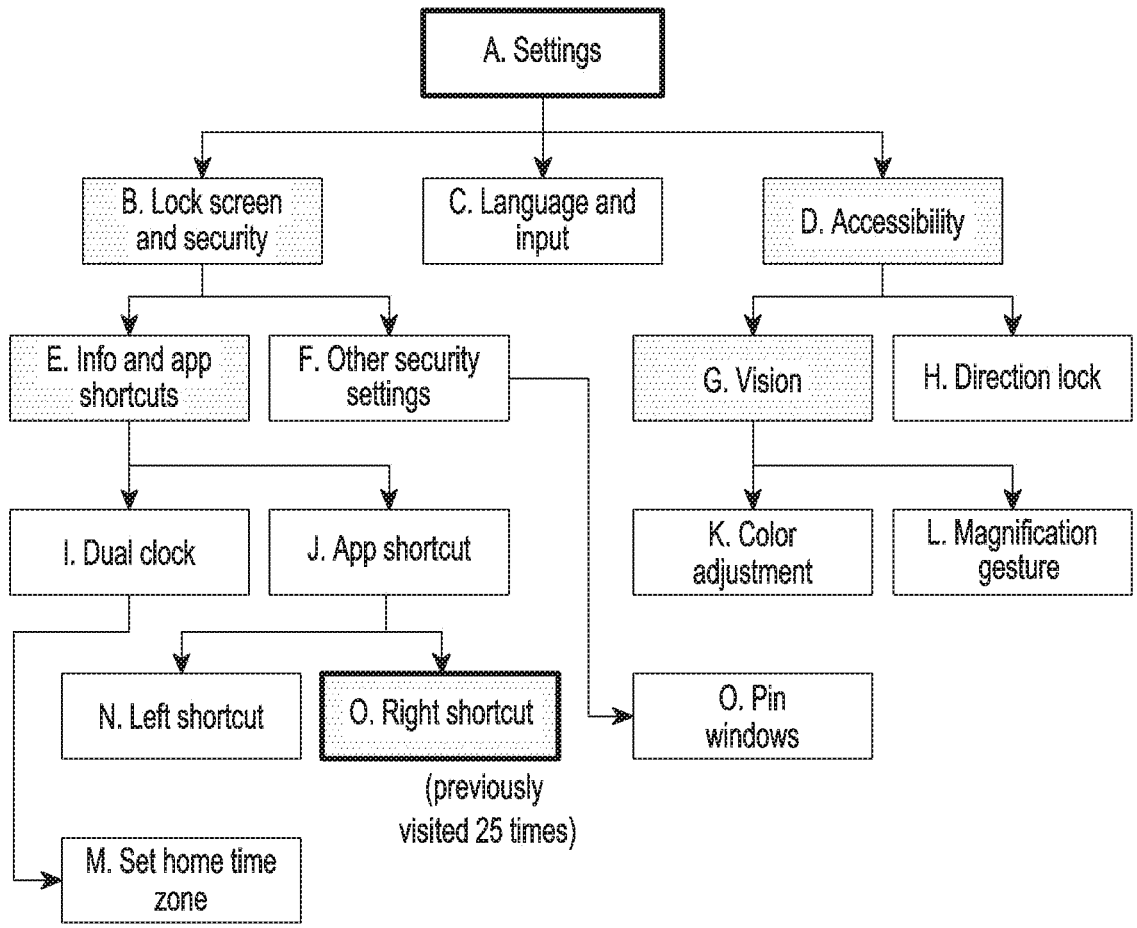
FIG. 11 is an example in which a hierarchical relationship between user interfaces of a setting of a native application is depicted according to an embodiment of the disclosure.

FIG. 11 is an example in which a hierarchical relationship between user interfaces of a setting of a native application is depicted according to an embodiment of the disclosure.

FIGS. 12A, 12B, 12C, 12D, 12E, 12F, 12G, 12H, 12I, and 12J are illustrate examples of a hierarchical relationship between user interfaces of the setting of the native application according to an embodiment of the disclosure.

Referring to FIG. 11, the hierarchical relationship between the user interfaces of the setting of the native application is explained with reference to FIGS. 12A, 12B, 12C, 12D, 12E, 12F, 12G, 12H, 12I, and 12J.

Referring to FIG. 12A, if the user selects on an accessibility option in a settings home page, then, according to rule 1 (from table 1), the accessibility option layer can open in an upper half portion of the display screen 130 and, according to rule 3b, the layer A shifts to rightmost part of a lower half portion of the display screen 130 as shown in FIG. 12B. Further, the graphical compound (e.g., a smart star, a smart finder or the like) predicts future states inside the currently traversed hierarchy based on past user activities. For example, referring to FIG. 12B, the color adjustment layer and assistant menu layer are most visited inside this hierarchy, so these layers can be shown to the user if the user clicks on the graphical element.

Referring to FIG. 12B, the user accesses a Lock Screen and Security layer from the layer A and, based on the rules, the Settings and Accessibility layer can be shown as illustrated in FIG. 12C. Further, the graphical compound predicts Pin Windows layer as the most visited shown in FIG. 12C. As the states are active, the user clicks the Vision option layer from the Accessibility option layer as the user wants to enable a magnification gesture option layer. The vision layer appears in the upper half portion of the display screen 130 and the Accessibility layer and Lock Screen and Security layer are siblings, so that the Accessibility, and Lock Screen and Security layers are placed at the left and right parts of the lower portion of the display screen 130 as shown in FIG. 12D.

Figure 12E:
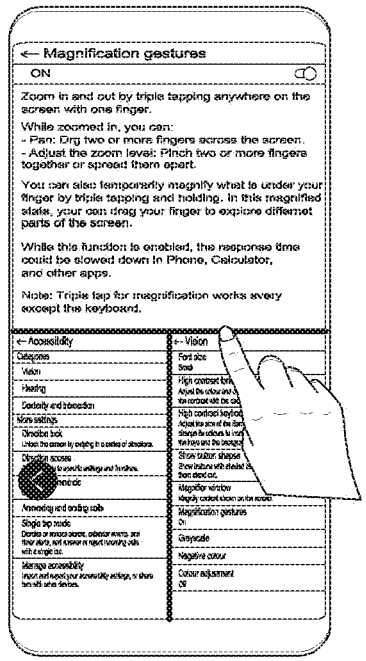

Further, the user wants to set a Right Shortcut layer (i.e., layer N in the application), the user does not have to click back many times to reach the root layer, and the user may just perform the gesture (e.g., swipe left) and click on the Lock Screen and Security layer from the layer A with a single click (by long press on the bar as shown in FIG. 12E). Based on the long press on the bar, the recent activities appear on the display screen 130.

Figure 12F:
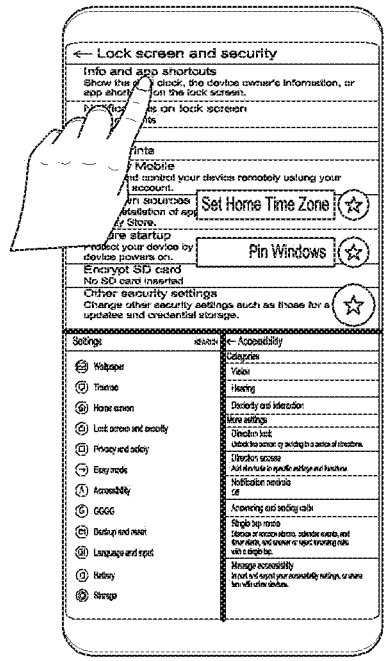

If the user want to select the Lock Screen and Security layer from the bar, the Lock Screen and Security layer appears at the top of the upper portion using rule 1 and rule 2a. The sibling of the Lock Screen and Security layer that is Accessibility (i.e., layer D) comes down in the lower portion of the display screen 130 as shown in FIG. 12F.

Figure 12G:
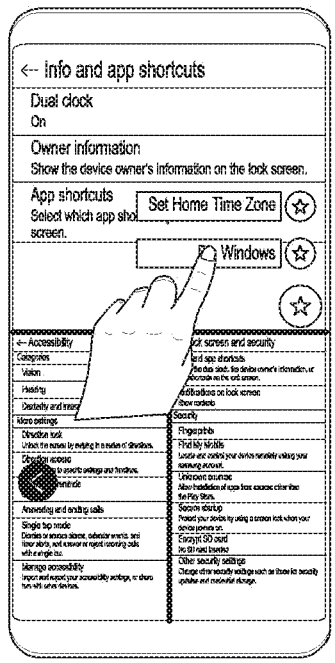
Figure 12H:
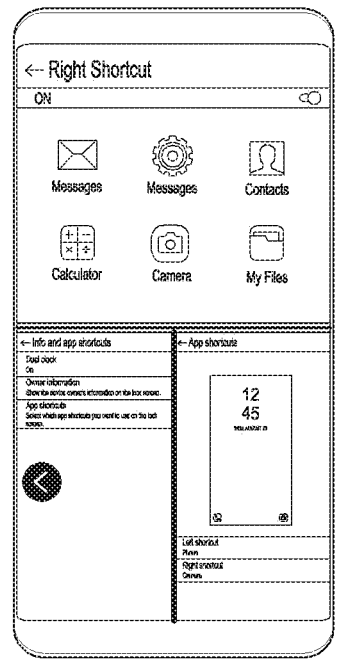

Referring to FIG. 12G, the user selects an info and app shortcuts layer (i.e., layer E) from the Lock Screen and Security layer (i.e., layer B), the graphical compound now predicts the most visited inside that particular hierarchy, and now Right Shortcut layer starts coming and Pin window layer can be replaced by the Right Shortcut layer as it most visited in this level. Now the user can click on the Right Shortcut layer as shown in FIG. 12G and can directly navigate to the Right Shortcut layer (i.e., layer O) by skipping the intermediate user interface layers according to rules 2a, 2b and 2c. Further, the right shortcut layer appears at the top of the upper portion of the display screen 130 as shown in FIG. 12H.

Figure 12I:
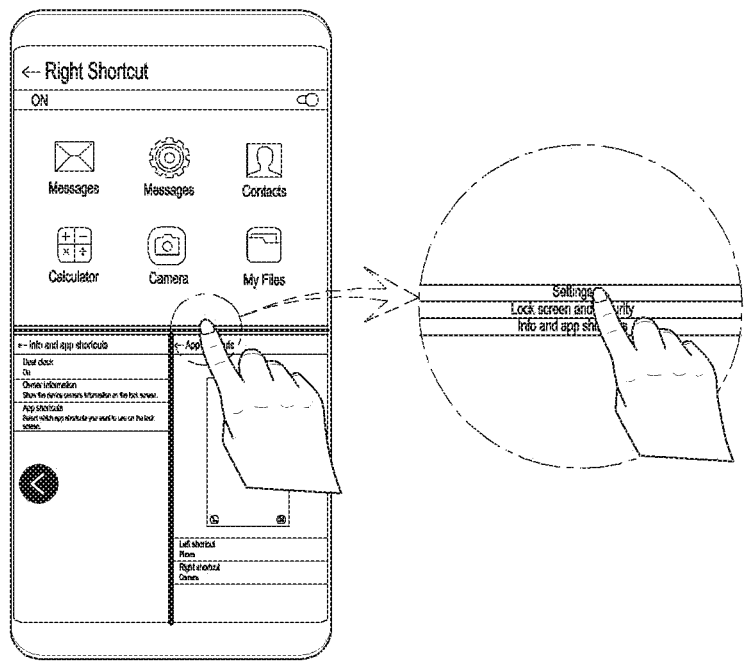
Figure 12J:

After the user has reached the $4^{th}$ layer and wants to come back to the $2^{nd}$ layer (i.e., in case the user wants to reach layer B). The user doesn't have to click back 3 times. The user can perform the gesture on the bars which can zoom as shown in FIG. 12I. The hierarchy is easily shown and the corresponding option is shown on the bars. Further, if the user clicks on the Lock Screen and Security layer, then the Lock Screen and Security layer appears on the top portion of the display screen 130 and the setting home page appears on the bottom portion of the display screen 130 based on the rule 1 and rules 2a, 2b and 2c as shown in FIG. 12J.

Figure 13:
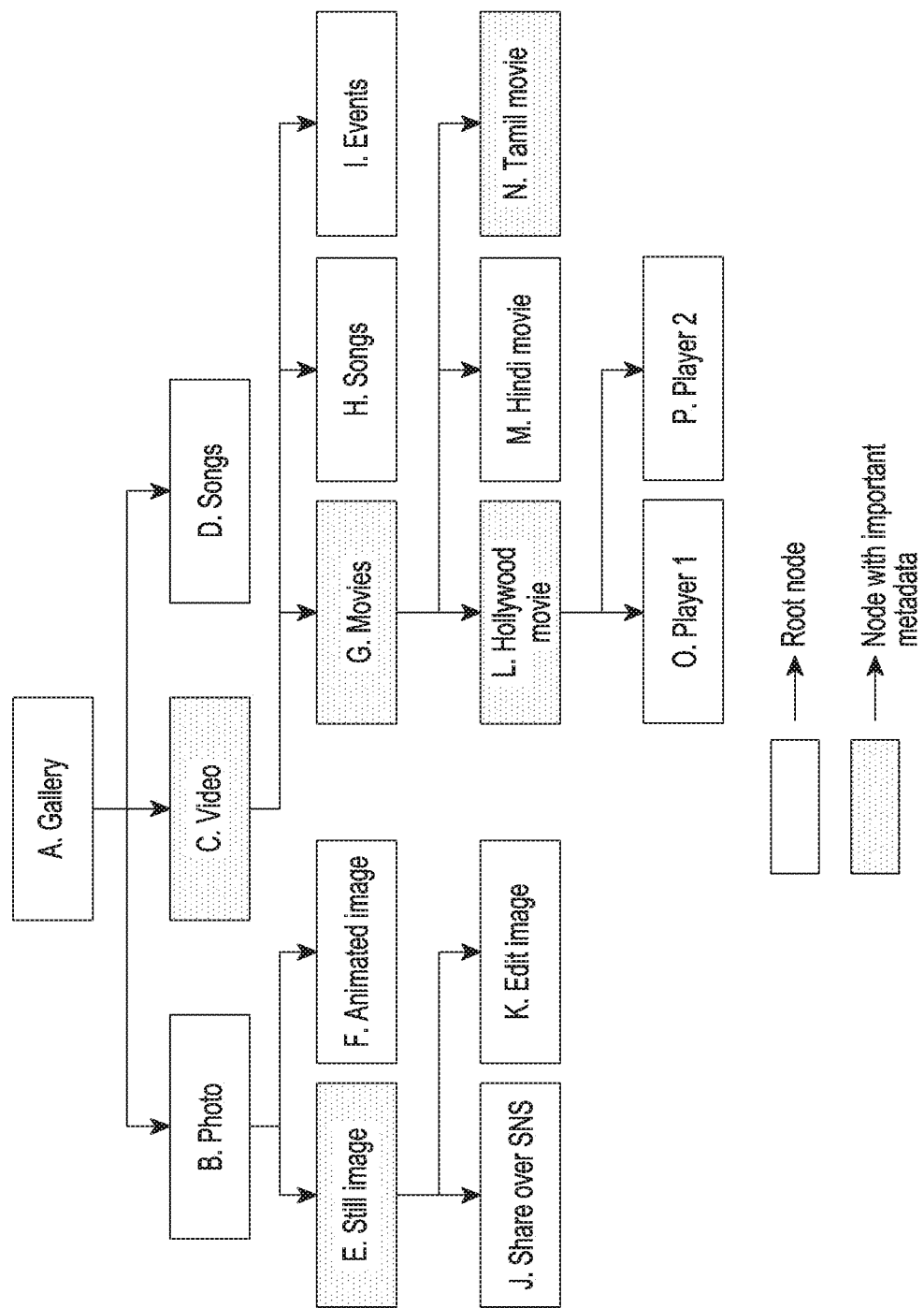
FIG. 13 is an example in which a hierarchical relationship between user interfaces of a gallery is depicted according to an embodiment of the disclosure.

FIG. 13 is an example in which a hierarchical relationship between user interfaces of a gallery is depicted according to an embodiment of the disclosure.

FIGS. 14A, 14B, 14C, 14D, 14E, 14F, 14G, 14H, and 14I illustrate examples in which a hierarchical relationship between user interfaces of a gallery is explained according to an embodiment of the disclosure.

Figure 14A:
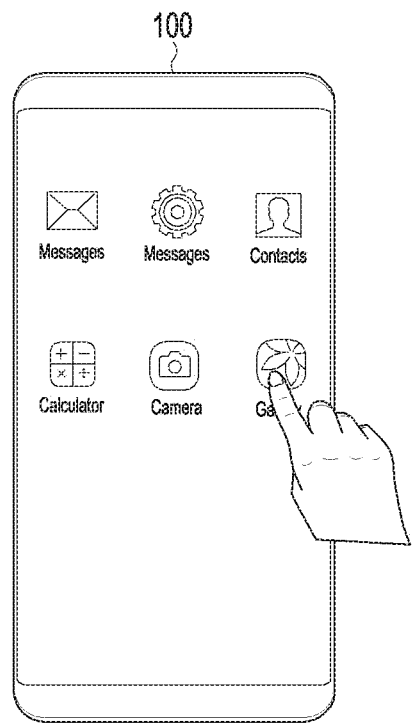
FIGS. 14A, 14B, 14C, 14D, 14E, 14F, 14G, 14H, and 14I illustrates example in which a hierarchical relationship between user interfaces of a gallery is explained according to an embodiment of the disclosure.
Figure 14B:
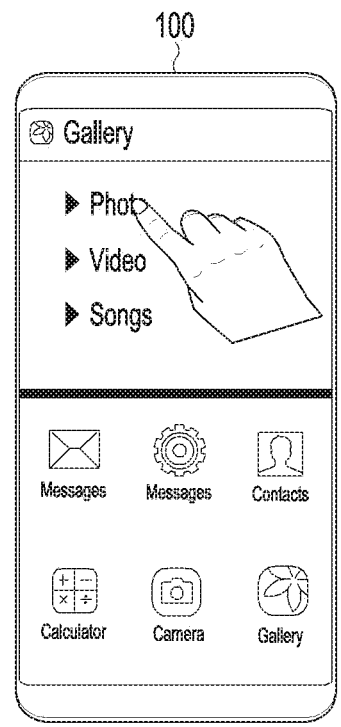

Referring to FIG. 13, the hierarchical relationship between the user interfaces of the gallery is explained with reference to FIGS. 14A, 14B, 14C, 14D, 14E, 14F, 14G, 14H and 14I. Referring to FIG. 14A, the user of the electronic device 100 wants to view the content (i.e., content includes photo, video and songs) in the gallery. After opening the gallery layer, the content includes the photo, the video and the songs displaying in the upper half portion of the display screen 130, and a home screen layer (i.e., gallery showing screen) is displaying in the lower half portion of the display screen 130 as shown in FIG. 14B.

Figure 14C:
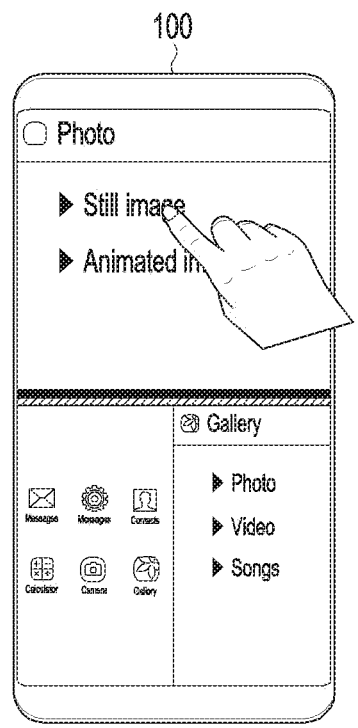

After opening the gallery layer, the user desires to see the photo layer in the galley layer. After accessing the photo layer, the photo layer including the still image and animated image is displaying in the upper half portion of the display screen 130 and the gallery layer and the home screen layer are displaying in the right side and the left side of the lower half portion of the display screen 130 as shown in FIG. 14C. From the photo, the user desires to see the still image layer. After accessing the still image layer, the still image layer displays in the upper half portion of the display screen 130, and the gallery layer and the photo layer display in the left side and the right side of the lower half portion of the display screen 130 as shown in FIG. 14D.

Figure 14D:
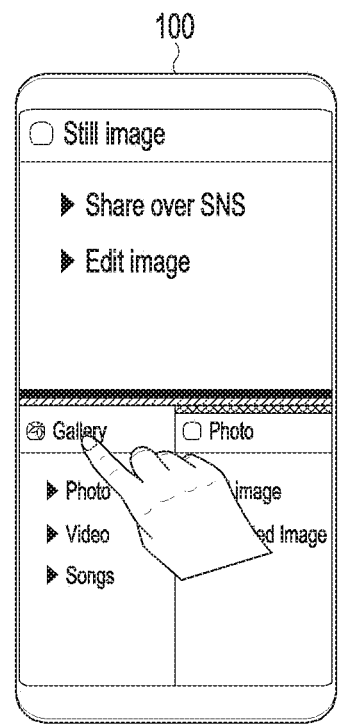
Figure 14E:
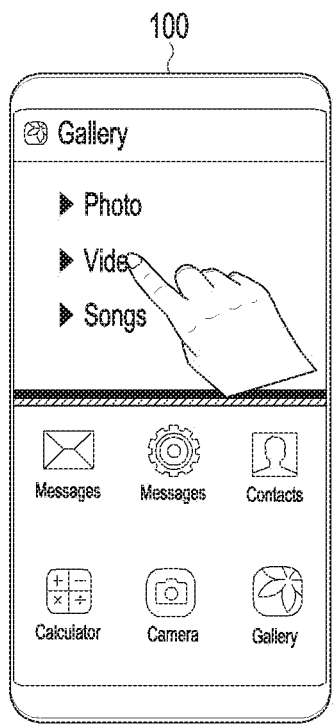
Figure 14F:
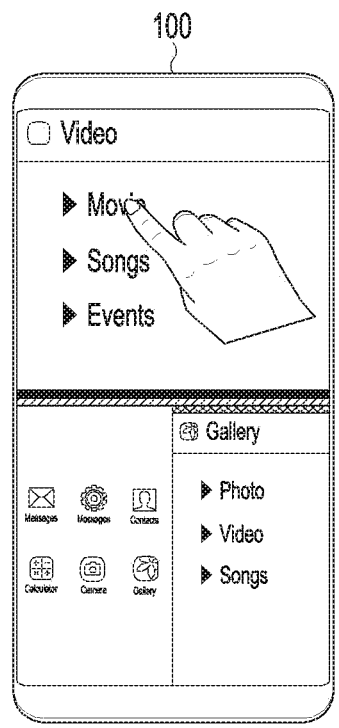
Figure 14G:
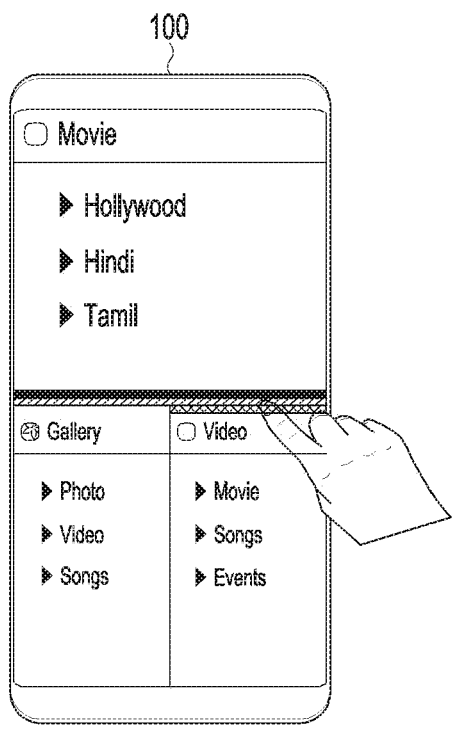
Figure 14H:
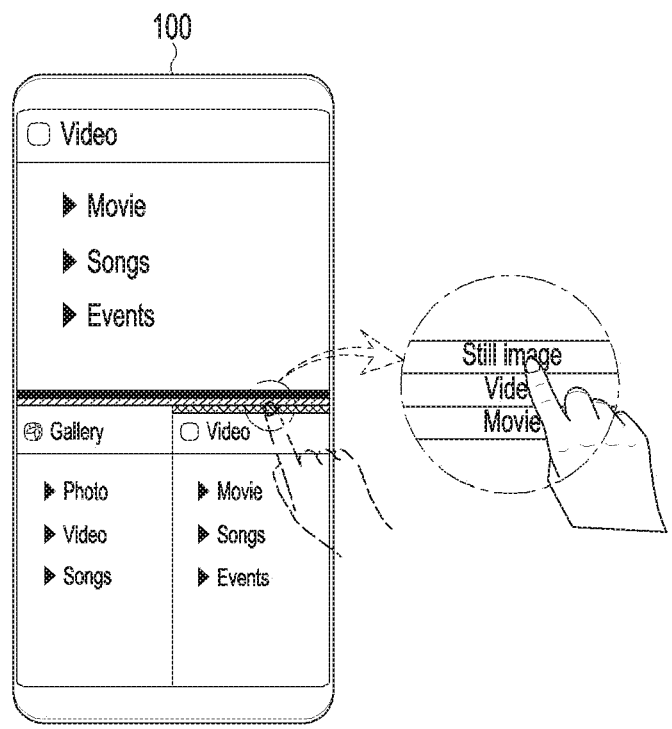
Figure 14I:
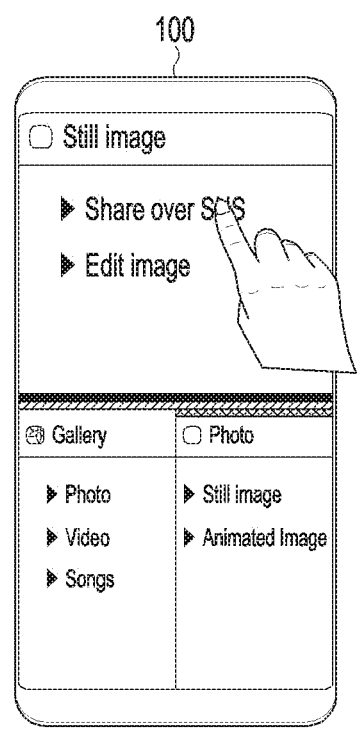

Further, if the user wants to view the video layer in the gallery layer, the user can access the video layer as shown in FIG. 14D. This improves the user experience by avoiding multiple back navigation operations to reach the video content. After selecting the video layer, the gallery layer appears in the upper half portion of the display screen 130, and the home screen layer appears in the lower half portion of the display screen 130 as shown in FIG. 14E. Referring to FIG. 14F, from the video, the user selects the movies, so that the movies layer, which includes the Hollywood, Hindi, and Tamil, appears in the upper half portion of the display screen 130, and the gallery layer and the video layer appear in the left side and the right side of the lower half portion of the display screen 130 as shown in FIG. 14G. When the user wishes to share the still image to their friend, the user of the electronic device 100 performs the gesture (e.g., a long press on the indicia) as shown in FIG. 14G. Based on the gesture, the user recent activities (e.g., gallery, still image, video, movies, etc.) are displayed on the indicia as shown in FIG. 14H. From the indicia, the user can select the still image. From the still image, the user can share the still image over a social networking site or a messaging service as shown in FIG. 14I. Unlike the methods according to the related art, the disclosure can be used to enhance the user experience by avoiding multiple back navigation operations to reach the still image content.

Figure 15:
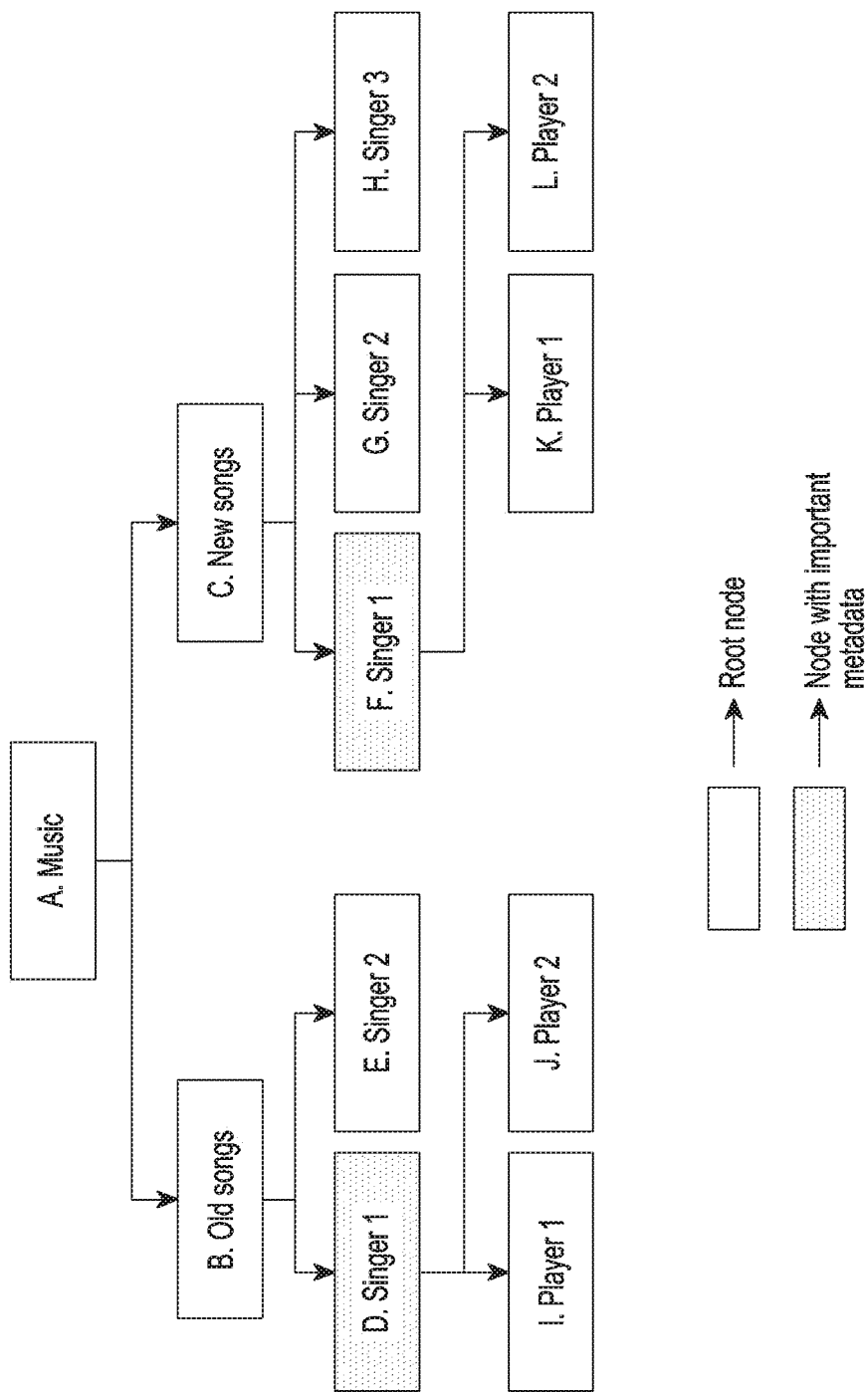
FIG. 15 is an example in which a hierarchical relationship between user interfaces of a music file is depicted according to an embodiment of the disclosure.

FIG. 15 is an example in which a hierarchical relationship between user interfaces of a music file is depicted according to an embodiment of the disclosure.

FIGS. 16A, 16B, 16C, 16D, 16E, 16F, and 16G illustrate examples in which a hierarchical relationship between user interfaces of a music file is explained according to an embodiment of the disclosure.

Referring to FIG. 15, the hierarchical relationship between the user interfaces of the music file is explained with reference to FIGS. 16A, 16B, 16C, 16D, 16E, 16F, and 16G.

Figure 16A:
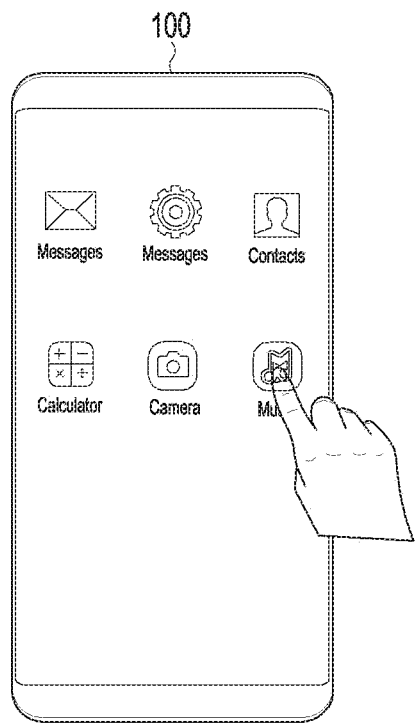
FIGS. 16A, 16B, 16C, 16D, 16E, 16F, and 16G illustrate examples in which a hierarchical relationship between user interfaces of a music file is explained according to an embodiment of the disclosure.
Figure 16B:
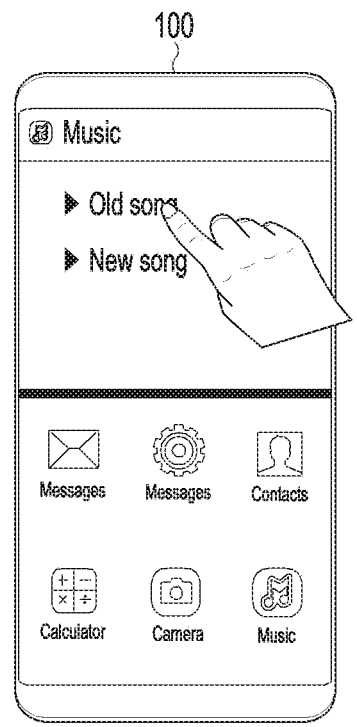
Figure 16C:
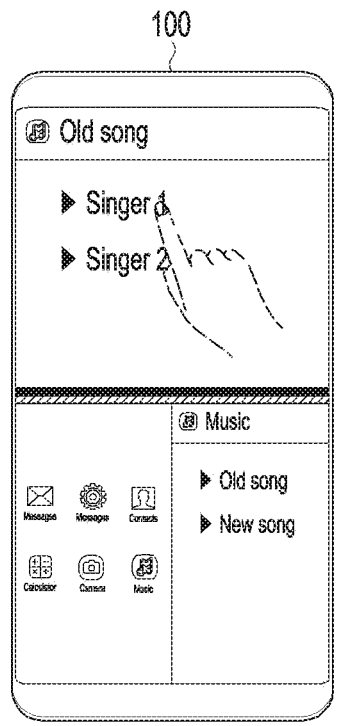
Figure 16D:
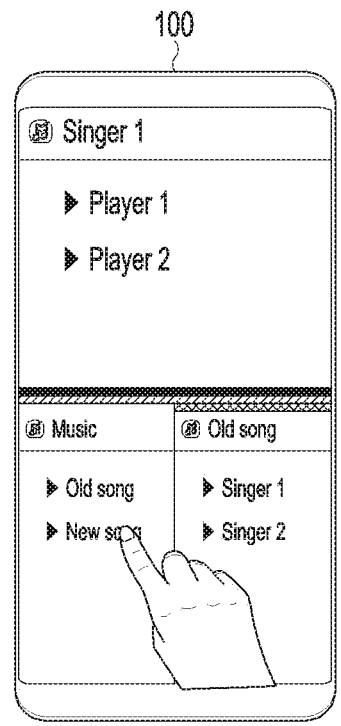

Referring to FIG. 16A, the user of the electronic device 100 wants to listen the song from a music file. After opening the music file layer, the music includes an old song and a new song displayed in the upper half portion of the display screen 130, and a home screen layer (i.e., music file showing screen) displayed in the lower half portion of the display screen 130 as shown in FIG. 16B. Referring to FIG. 16C, after accessing the old song layer, the old song including a singer 1 and a singer 2 is displayed in the upper half portion of the display screen 130 and the music file layer and the home screen layer are displayed in the right side and the left side of the lower half portion of the display screen 130. When the singer 1 song from the old song is about to play, and the user wishes to listen the new song, then the user can navigate to the new song from the music file quickly as shown in FIG. 16D. This improves the quick access of the operation without any delay.

Figure 16E:
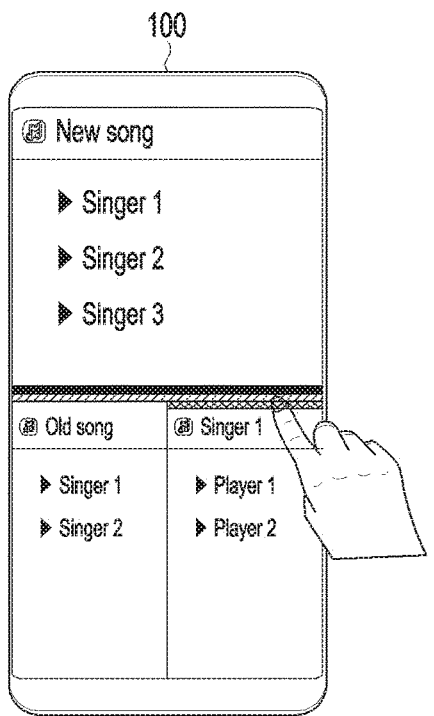
Figure 16F:
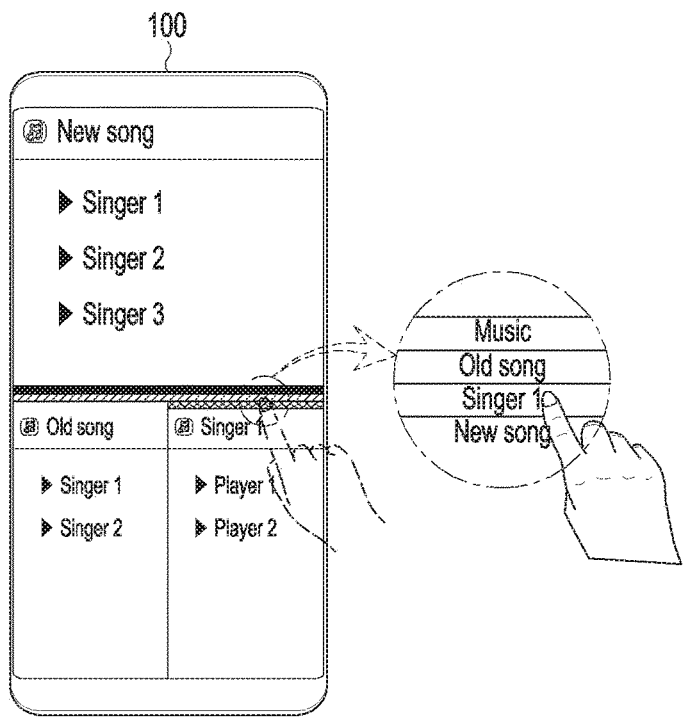
Figure 16G:
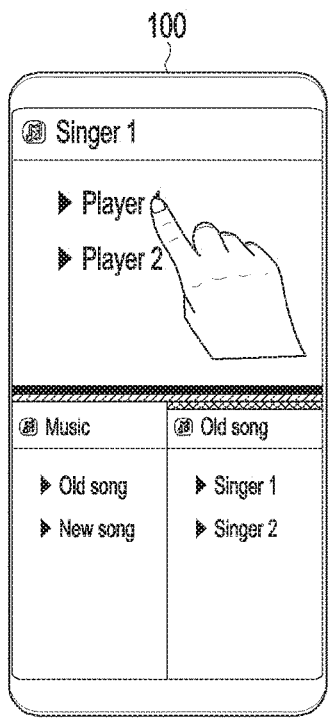

After accessing the new song layer, the new song including a singer 1, a singer 2, and a singer 3 is displayed in the upper half portion of the display screen 130 and the old song layer and the singer 1 layer from the old song layer is displayed in the lower half portion of the display screen 130 as shown in FIG. 16E. But, the user desires to listen to the singer 1 of the old song, then the user of the electronic device 100 performs the gesture (e.g., a long press on the indicia) as shown in FIG. 16E. Based on the gesture, the user recent activities (e.g., music, old song, singer 1, new song etc.) are displayed on the indicia as shown in FIG. 16E. From the indicia, the user can select singer 1 of the old song, and play using the player 1 as shown in FIG. 16G. This enhances the user experience by avoiding the many back navigation operations to reach the desired song.

Figure 17:
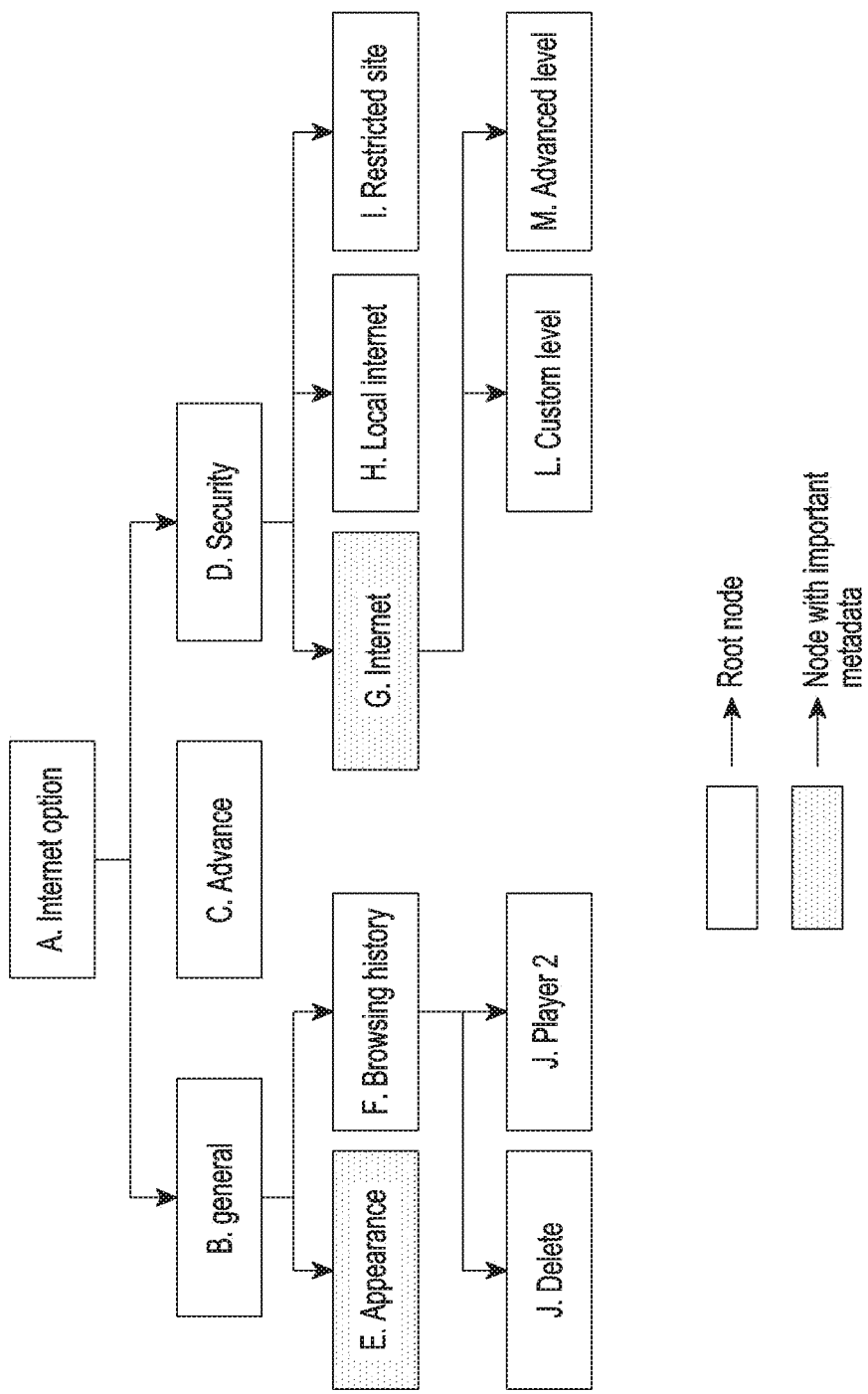
FIG. 17 is an example in which a hierarchical relationship between user interfaces of an Internet option is depicted according to an embodiment of the disclosure.

FIG. 17 is an example in which a hierarchical relationship between user interfaces of an Internet option is depicted according to an embodiment of the disclosure.

FIGS. 18A, 18B, 18C, 18D, 18E, 18F, and 18G illustrate examples in which a hierarchical relationship between user interfaces of an Internet option is explained according to an embodiment of the disclosure.

Referring to FIG. 17, the hierarchical relationship between user interfaces of the Internet option is explained with reference to FIGS. 18A, 18B, 18C, 18D, 18E, 18F, and 18G.

Figure 18A:
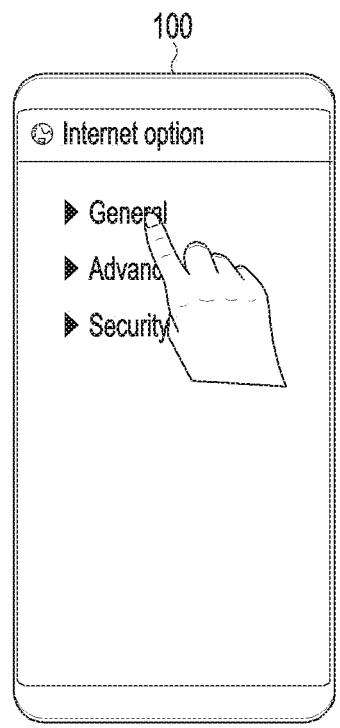
FIGS. 18A, 18B, 18C, 18D, 18E, 18F, and 18G illustrate examples in which a hierarchical relationship between user interfaces of an Internet option is explained according to an embodiment of the disclosure.
Figure 18B:
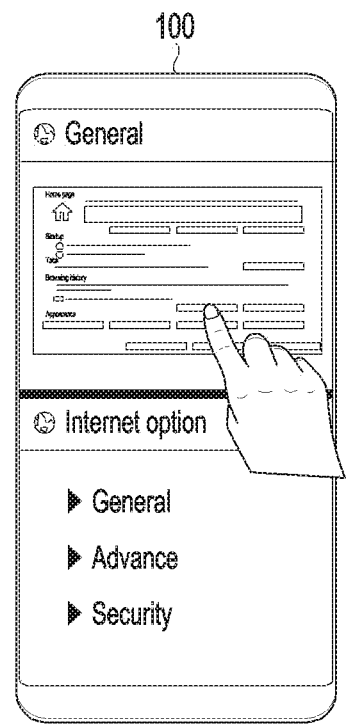

Referring to FIG. 18A, the user of the electronic device 100 wants to change their Internet option setting as shown in FIG. 18A. After opening the Internet option, the Internet option (i.e., layer A) includes various options (e.g., general, advance and security). If the user wants to change the general option (i.e., layer B) in the Internet setting, the general option appears in the upper half portion of the display screen 130, and the option of the Internet setting appears in the lower half portion of the display screen 130 as shown in FIG. 18B.

Figure 18C:
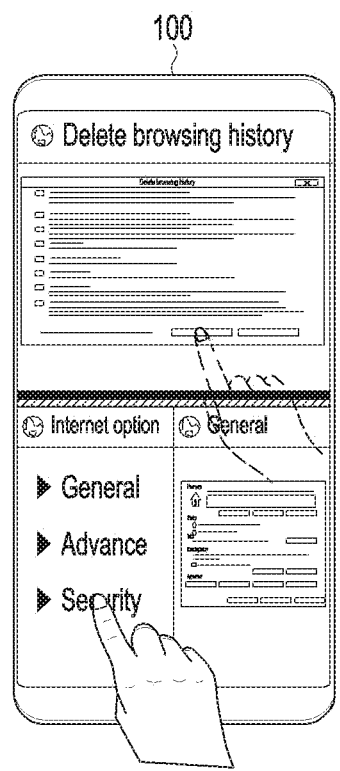
Figure 18D:
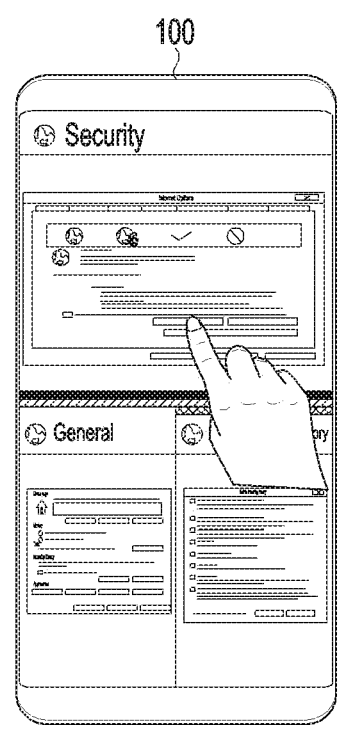
Figure 18E:
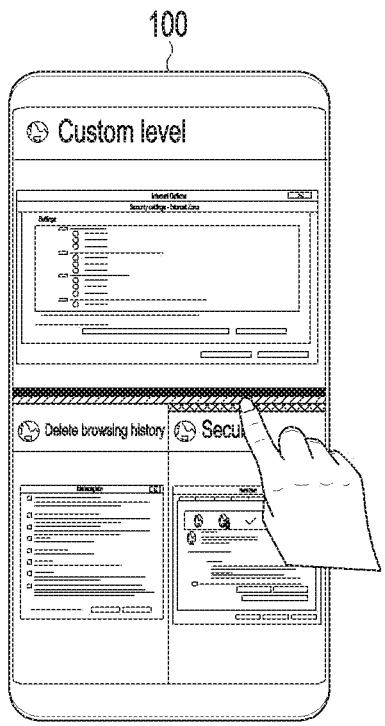
Figure 18F:
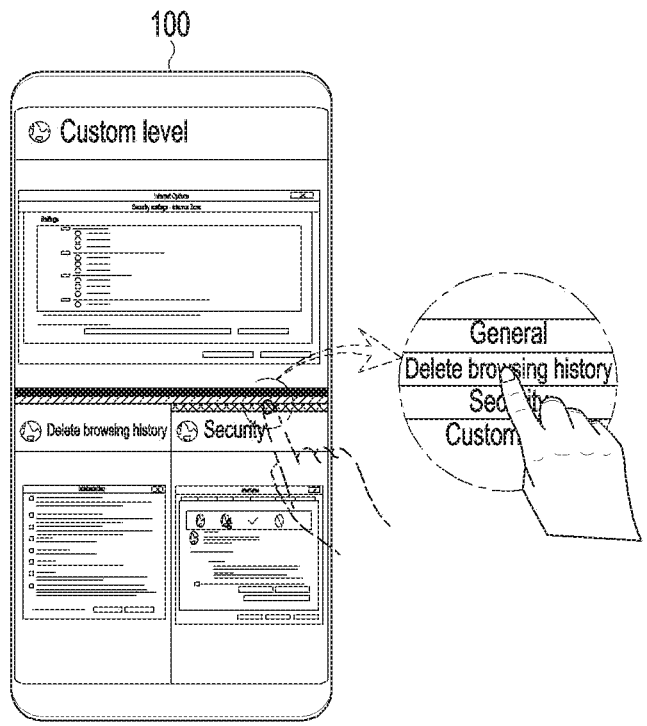
Figure 18G:
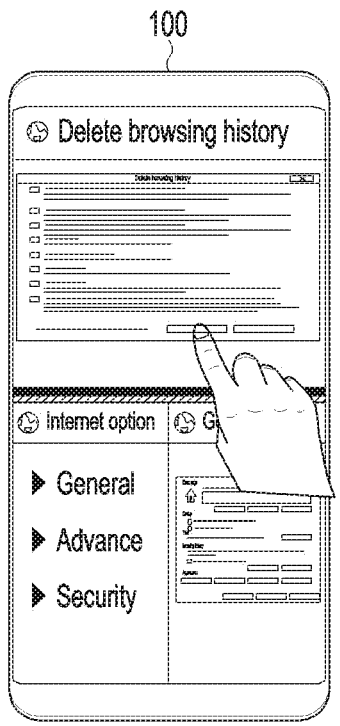

After accessing the general option, the user is about to change some option in general, but the user accesses the security option (layer D) as shown in FIG. 18C. After accessing the security option, the security option appears in the upper half portion of the display screen 130 and the general option and delete browsing history (i.e., layer F) appear in the lower half portion of the display screen 130 as shown in FIG. 18D. In the security option, the user is about to change the custom level (i.e., layer L), but if the user wishes to delete all browsing history, then the user performs the gesture (e.g., a long press on the indicia) as shown in FIG. 18E. Based on the gesture, the user recent activities (e.g., general, delete browsing history, security, custom level, etc.) are displayed on the indicia as shown in FIG. 18E. From the indicia, the user can select and delete the browsing history from the delete browsing history option as shown in FIG. 18G. This enhances the user experience in time effective way by avoiding the many of back navigation operations to reach the delete browsing history option.

Figure 19:
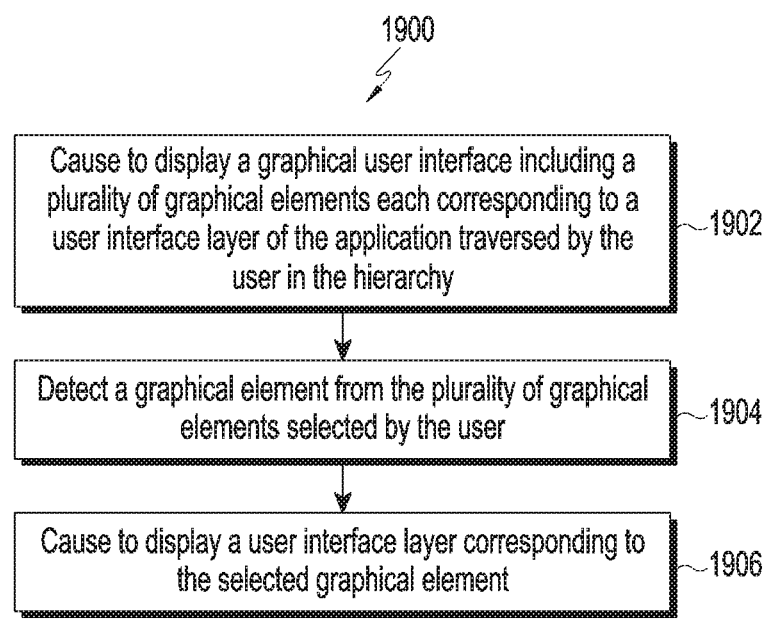
FIG. 19 is a flow diagram illustrating a method to manage traversing across multiple user interface layers in an application that has been relaunched according to an embodiment of the disclosure.

FIG. 19 is a flow diagram illustrating a method to manage traversing across multiple user interface layers in an application that has been relaunched according to an embodiment of the disclosure.

Referring to FIG. 19, an example method is illustrated in flow diagram 1900. At operation 1902, the method includes causing to display the graphical user interface including the plurality of graphical elements each corresponding to the user interface layer of the application traversed by the user in the hierarchy. In an embodiment, the method allows the traverse manager 110 to cause to display a graphical user interface including the plurality of graphical elements, the graphical user interfaces each corresponding to the user interface layer of the application traversed by the user in the hierarchy.

At operation 1904, the method includes detecting the graphical element from the plurality of graphical elements selected by the user. In an embodiment, the method allows the traverse manager 110 to detect the graphical element from the plurality of graphical elements selected by the user. At operation 1906, the method includes causing to display the user interface layer corresponding to the selected graphical element. In an embodiment, the method allows the traverse manager 110 to cause to display the user interface layer corresponding to the selected graphical element.

In an example, the application may be closed due to some system error (e.g., an application level force close) or due to the user exiting the application. In that case, the user may want to begin work from the same place or from some intermediate activity present in the path of the previously opened activity, then an overlay can be shown for some time at some part of the display screen 130 like a bottom part of the display screen 130 which shows in some interactive manner all the intermediate activities that the user traversed in order to reach the last activity before the application was closed. This allows the user to change anything in the intermediate activities like an address or product in the application or navigate directly to the last activity. This can be easily done as the disclosure maintains the count of the last visited activities.

Figure 20:
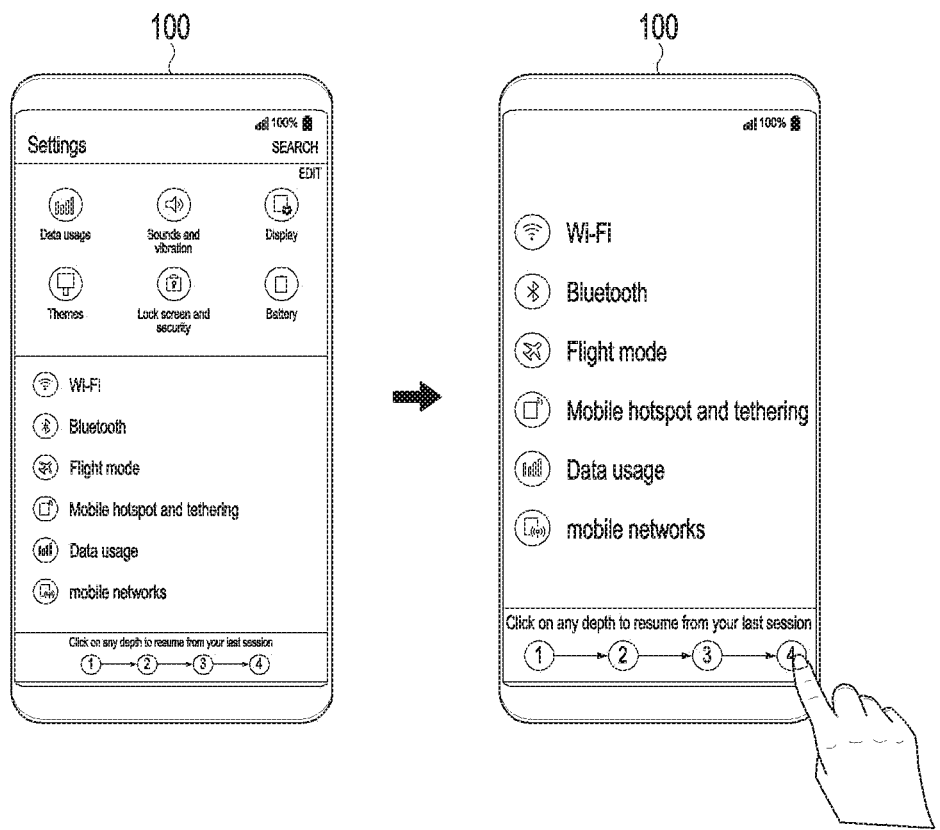
FIG. 20 is an example of traversing across multiple user interface layers of an application that has been relaunched according to an embodiment of the disclosure.

FIG. 20 is an example of traversing across multiple user interface layers of an application that has been relaunched according to an embodiment of the disclosure.

Referring to FIG. 20, the user of the electronic device 100 reaches the user interface layer related to a mobile hotspot and tethering, a data usage and a mobile network form the setting of the native application. Consider, suddenly, the native application is relaunched, in that case the user does not initiate the process from beginning, the user can directly reach the user interface layer related to the mobile hotspot and tethering, and the data usage and the mobile network from the native application by clicking the indicia (scrollable link icon) of the last session.

The various actions, actions, blocks, operations, or the like in the flow diagram 1900 may be performed in the order presented, in a different order or simultaneously. Further, in some embodiments, some of the actions, acts, blocks, operations, or the like may be omitted, added, modified, skipped, or the like without departing from the scope of the disclosure.

Figure 21:
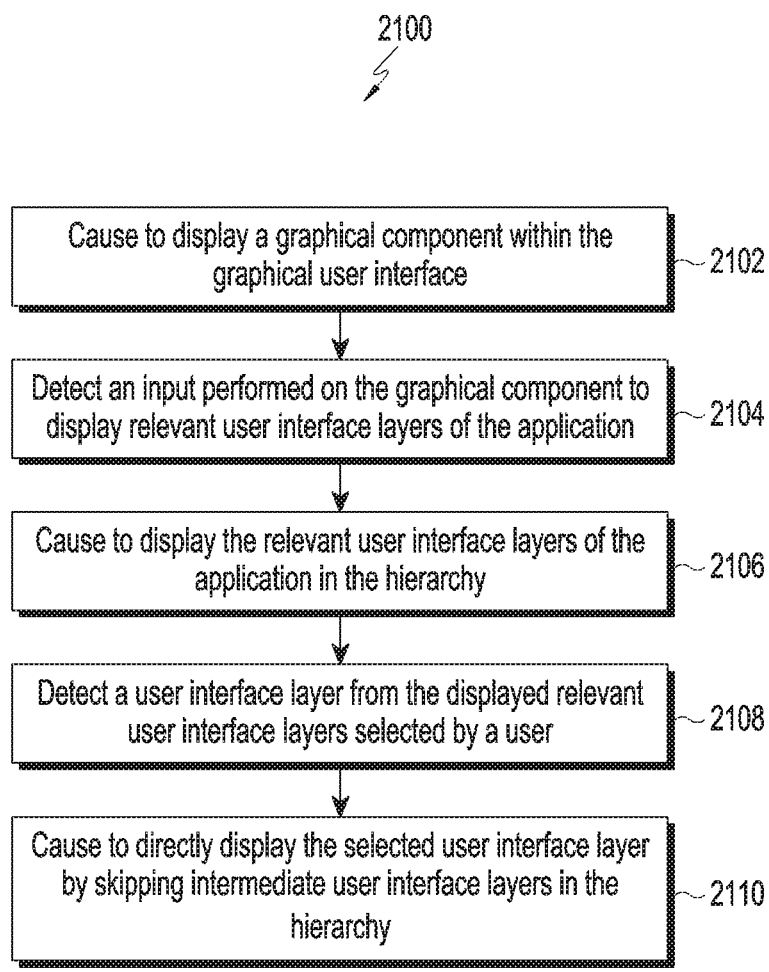
FIG. 21 is a flow diagram illustrating a method to manage traversing across multiple user interface layers of an application based on metadata according to an embodiment of the disclosure.

FIG. 21 is a flow diagram illustrating a method to manage traversing across multiple user interface layers of an application based on metadata according to an embodiment of the disclosure.

Referring to FIG. 21, an example method is illustrated in flow diagram 2100. At operation 2102, the method includes causing to display the graphical component within the graphical user interface. In an embodiment, the method allows the traverse manager 110 to display the graphical component within the graphical user interface. At operation 2104, the method includes detecting the input performed on the graphical component to display relevant user interface layers of the application. In an embodiment, the method allows the traverse manager 110 to detect the input performed on the graphical component to display relevant user interface layers of the application.

At operation 2106, the method includes causing to display the relevant user interface layers of the application in the hierarchy. In an embodiment, the method allows the traverse manager 110 to display the relevant user interface layers of the application in the hierarchy. At operation 2108, the method includes detecting the user interface layer from the displayed relevant user interface layers selected by the user. In an embodiment, the method allows the traverse manager 110 to detect the user interface layer from the displayed relevant user interface layers selected by the user. At operation 2110, the method includes causing to directly display the selected user interface layer by skipping intermediate user interface layers in the hierarchy. In an embodiment, the method allows the traverse manager 110 to directly display the selected user interface layer by skipping intermediate user interface layers in the hierarchy.

In an example, a smart finder can be used to show the future states to the user. These states could be predicted based on additional metadata a most visited state by the user or based on prioritized states provided by the individual application. The smart finder would be active whenever there is a state to be predicted to the user at a particular level. The user can view the predicted states by clicking the smart finder and directly navigate to that specific state.

Figure 22:
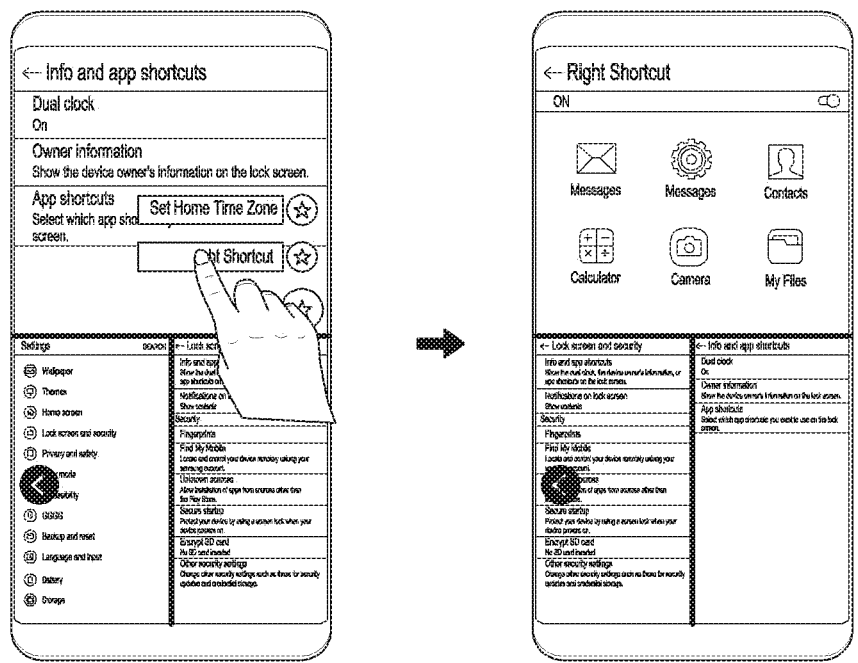
FIG. 22 is an example of traversing across multiple user interface layers of an application based on metadata according to an embodiment of the disclosure.

FIG. 22 is an example of traversing across multiple user interface layers of an application based on metadata according to an embodiment of the disclosure.

Referring to FIG. 22, the smart finder is activated by opening an "Info and app shortcuts" screen. Further, the "Right Shortcut" screen opens directly, thereby skipping an intermediate "App Shortcuts" screen based on the metadata.

The various actions, actions, blocks, operations, or the like in the flow diagram 2100 may be performed in the order presented, in a different order or simultaneously. Further, in some embodiments, some of the actions, actions, blocks, operations, or the like may be omitted, added, modified, skipped, or the like without departing from the scope of the disclosure.

Figure 23:
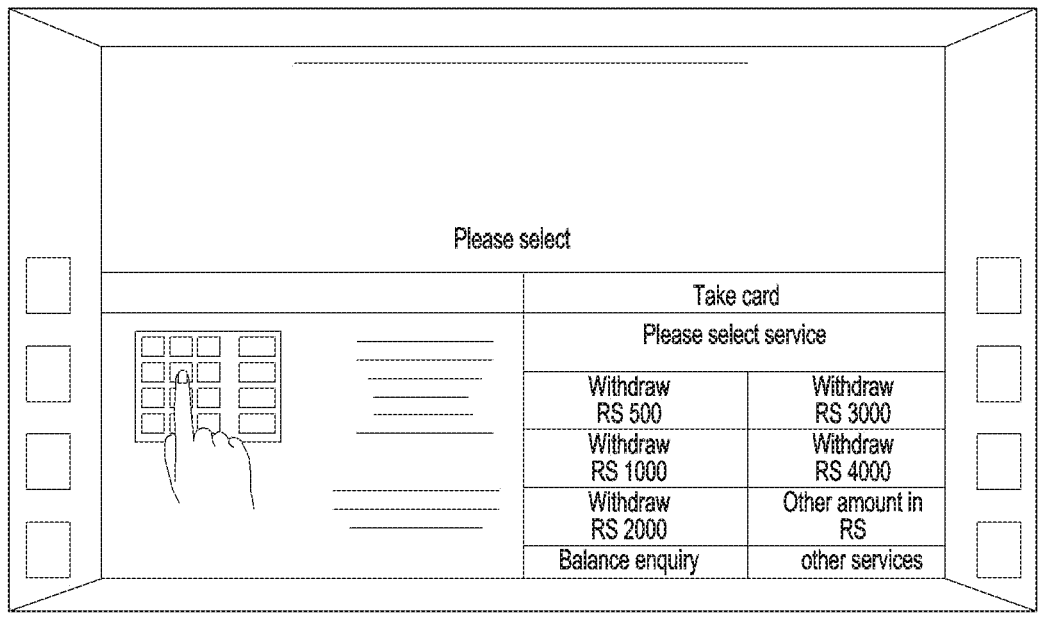
FIG. 23 depicts a display screen of an automated teller machine (ATM) according to an embodiment of the disclosure.

FIG. 23 depicts a display screen of an automated teller machine (ATM) according to an embodiment of the disclosure.

Referring to FIG. 23, in current ATMs, where a single state is visible at a time, to repeat a transaction, the user needs to start from the beginning (i.e., the root node). Further, as per the current implementation, the ATM does not support going back to a previous level. In an example, based on the disclosure, three active states are visible to the user at the same time so that, if the user wants to repeat a transaction (i.e., withdraw money, etc.), the user can interact directly with the state in a bottom right and easily complete the transaction.

Figure 24:
FIG. 24 depicts a display screen of a wearable device according to an embodiment of the disclosure.

FIG. 24 depicts a display screen of a wearable device according to an embodiment of the disclosure.

Referring to FIG. 24, a hierarchical relationship among the levels in a wearable device, such as a smart watch, is illustrated. The wearable device can be, for example but not limited to a, smart watch, smart ring, a smart band, or the like. In current smart watch, the user wants to read a help page. The user starts from the beginning and reach the help page. Now, if the user views previous pages, then the user needs to press a back button n times. After applying the disclosure, the user does not need to the press back button as the hierarchy is visible on a dial of the smart watch. The user can zoom in to see a hierarchy, which depicts the application and the previous active states of the application. After viewing, the user can switch to any previous state in single selection. This save user time and eases interaction.

Those skilled in the art will appreciate that the disclosure may be practiced in a network computing environment with many types of computer system configurations, including, personal computers (PCs), desktop computers, laptop computers, message processors, hand-held devices, multi-processor systems, microprocessor-based or programmable consumer electronics, network PCs, minicomputers, mainframe computers, mobile telephones, or the like.

The disclosure can be implemented in a hand-held device like point of sale terminals (POS) and other displays being used in retail sector to disperse information in an interactive manner. Some examples include, ATMs, self-booking kiosks, interactive maps etc. Further, the disclosure can also be implemented in an Internet of things (IoT) environment.

Figure 25:
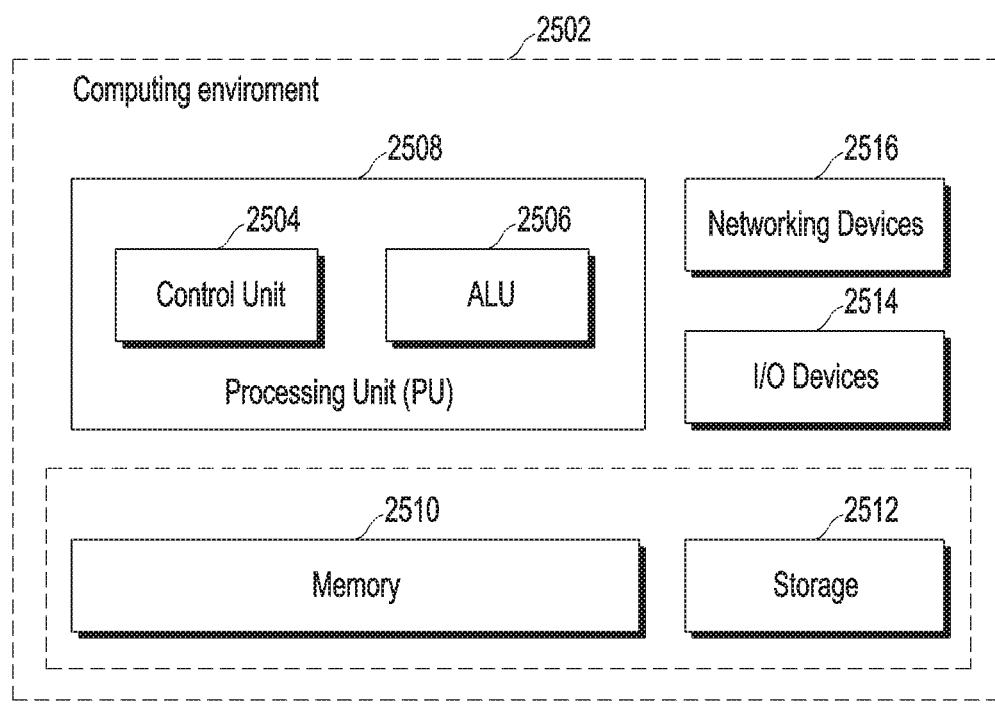
FIG. 25 illustrates a computing environment implementing a method to manage traversing across multiple user interface layers of an application according to an embodiment of the disclosure.

FIG. 25 illustrates a computing environment implementing a method to manage traversing across multiple user interface layers of an application according to an embodiment of the disclosure.

Referring to FIG. 25, a computing environment 2502 is illustrated. The computing environment 2502 comprises at least one processing unit 2508 that is equipped with a control unit 2504, an arithmetic logic unit (ALU) 2506, a memory 2510, a storage unit 2512, a plurality of networking devices 2516 and a plurality input/output (I/O) devices 2514. The processing unit 2508 is responsible for processing the instructions of the technique. The processing unit 2508 receives commands from the control unit 2504 in order to perform its processing. Further, any logical and arithmetic operations involved in the execution of the instructions are computed with the help of the ALU 2506.

The overall computing environment 2502 can be composed of multiple homogeneous or heterogeneous cores, multiple central processing units (CPUs) of different kinds, special media and other accelerators. The processing unit 2508 is responsible for processing the instructions of the technique. Further, the at least one processing unit 2508 may be located on a single chip or over multiple chips.

The technique comprising of instructions and codes required for the implementation are stored in either the memory 2510 or the storage unit 2512 or both. At the time of execution, the instructions may be fetched from the corresponding memory 2510 or storage unit 2512, and executed by the processing unit 2508.

In case of any hardware implementations various networking devices 2516 or external I/O devices 2514 may be connected to the computing environment 2502 to support the implementation through the networking unit and the I/O device unit.

The embodiments disclosed herein can be implemented through at least one software program running on at least one hardware device and performing network management functions to control the elements. The elements shown in FIGS. 1B to 25 include blocks, elements, actions, acts, operations, or the like which can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of controlling a user interface layer in an application by an electronic device, the method comprising:
   identifying a plurality of user interface layers of the application, wherein each of the plurality of user interface layers correspond to a specific level on a hierarchical structure related to the plurality of user interface layers of the application;
   displaying, on a screen of the electronic device, a plurality of indicators corresponding to the plurality of user interface layers of the application
   and a graphical element within a region of the plurality of indicators;
   in response to receiving an input on the graphical element, identifying at least one indicator corresponding to the input on the graphical element from among the plurality of indicators;
   displaying, on the screen, the at least one indicator based on the hierarchical structure of the application;
   detecting a gesture on a first indicator from among the plurality of indicators; and
   displaying, on the screen, a first user interface layer corresponding to the first indicator from among a plurality of layers in response to detecting the gesture,
   wherein the plurality of user interface layers comprise at least one interface layer which is currently displayed and at least one user interface layer previously displayed.

2. The method of claim 1, wherein the at least one indicator is arranged based on at least one rule.

3. The method of claim 1, further comprising:
   identifying the at least one indicator from among the plurality of indicators based on at least one of a rule and the hierarchical structure of the application.

4. The method of claim 1, further comprising:
   displaying the first user interface layer by skipping intermediate user interface layers of the plurality of user interface layers in the hierarchical structure of the application.

5. The method of claim 1, wherein each of the plurality of user interface layers comprises scrollable components for interaction.

6. The method of claim 1
   wherein each of the user interface layers of the application comprises scrollable components scrollable between the user interface layers, and
   wherein the hierarchical structure of the plurality of user interface layers is represented by a polygonal figure, which is divided into discrete layers representing each of the user interface layers at a particular level.

7. The method of claim 6, further comprising:
   identifying whether an input corresponding to a command to enlarge the first indicator is received; and
   in response to receiving the input corresponding to the command to enlarge the first indicator, enlarging a size of the first indicator and reducing a size of the at least one indicator except the first indicator.

8. A non-transitory computer-readable storage medium configured to store one or more computer programs including instructions that, when executed by at least one processor, cause the at least one processor to perform the method of claim 1.

9. An electronic device to control a user interface layer in an application, the electronic device comprising:
   a memory; and
   at least one processor configured to:
      identify a plurality of user interface layers of the application, wherein each of the plurality of user interface layers correspond to a specific level on a hierarchical structure related to the plurality of user interface layers of the application,
      display, on a screen of the electronic device, a plurality of indicators corresponding to the plurality of user interface layers of the application
      and a first graphical element within a region of the plurality of indicators,
      in response to receiving an input on the graphical element, identify at least one indicator corresponding to the input on the graphical element from among the plurality of indicators,
      display, on the screen, the at least one indicator based on the hierarchical structure of the application,
      detect a gesture on a first indicator from among the plurality of indicators, and
      display, on the screen, a first user interface layer corresponding to the first indicator from among the plurality of layers in response to detecting the gesture,
   wherein the plurality of user interface layers comprise at least one interface layer which is currently displayed and at least one user interface layer previously displayed.

10. The electronic device of claim 9, wherein the at least one indicator is arranged based on at least one rule.

11. The electronic device of claim 9, wherein the at least one processor is further configured to identify at least one indicator from among the plurality of indicators based on at least one of a rule and the hierarchical structure of the application.

12. The electronic device of claim 9, wherein the at least one processor is further configured to:
   display the first user interface layer by skipping intermediate user interface layers of the plurality of user interface layers in the hierarchical structure of the application.

13. The electronic device of claim 9, wherein each of the plurality of user interface layers comprises scrollable components for interaction.

14. The electronic device of claim 9,
wherein each of the user interface layers of the application comprises scrollable components scrollable between the user interface layers, and
wherein hierarchy of each of the user interface layers of the application is represented by a polygonal figure, which is divided into discrete layers representing each of the user interface layers at a particular level.

15. The electronic device of claim 14, wherein the at least one processor is further configured to:
determine whether an input corresponds to a command to enlarge the first indicator is received, and
in response to receiving the input corresponding to the command to enlarge the first indicator, enlarge a size of the first indicator and reduce a size of the at least one indicator except the first indicator.

\* \* \* \* \*